United States Patent
Asati et al.

(10) Patent No.: US 11,082,342 B2
(45) Date of Patent: *Aug. 3, 2021

(54) SYSTEM AND METHOD TO FACILITATE CONTENT FORWARDING USING BIT INDEX EXPLICIT REPLICATION (BIER) IN AN INFORMATION-CENTRIC NETWORKING (ICN) ENVIRONMENT

(71) Applicant: Cisco Technology, Inc., San Jose, CA (US)

(72) Inventors: Rajiv Asati, Morrisville, NC (US); Nagendra Kumar Nainar, Morrisville, NC (US); Carlos M. Pignataro, Raleigh, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/511,730

(22) Filed: Jul. 15, 2019

(65) Prior Publication Data
US 2019/0342213 A1    Nov. 7, 2019

Related U.S. Application Data

(63) Continuation of application No. 15/469,306, filed on Mar. 24, 2017, now Pat. No. 10,404,592.

(51) Int. Cl.
*H04L 12/741*  (2013.01)
*H04L 29/08*  (2006.01)
(Continued)

(52) U.S. Cl.
CPC ............ *H04L 45/74* (2013.01); *H04L 45/64* (2013.01); *H04L 67/2842* (2013.01); *H04L 67/327* (2013.01); *H04L 69/22* (2013.01)

(58) Field of Classification Search
CPC ....... H04L 45/74; H04L 45/64; H04L 45/745; H04L 45/7453; H04L 45/7457;
(Continued)

(56) References Cited

U.S. PATENT DOCUMENTS

| | | |
|---|---|---|
| 5,469,562 A | 11/1995 | Saether et al. |
| 6,415,031 B1 | 7/2002 | Colligan et al. |

(Continued)

FOREIGN PATENT DOCUMENTS

| | | |
|---|---|---|
| EP | 2557817 A1 | 2/2013 |
| WO | 2016/093749 A1 | 6/2016 |

OTHER PUBLICATIONS

Tae Won Cho, et al., "Enabling Content Dissemination Using Efficient and Scalable Multicast", IEEE INFOCOM 2009, Apr. 19-25, 2009, Rio de Janeiro, Brazil, 9 pages.
(Continued)

*Primary Examiner* — Candal Elpenord

(57) ABSTRACT

A method is provided in one example embodiment and may include receiving a packet by a forwarder in an Information-Centric Networking (ICN) network; determining Bit Index Explicit Replication (BIER) information associated with the packet; and forwarding the packet based, at least in part, on the BIER information associated with the packet. The packet can be an interest packet or a data packet received by the forwarder in the ICN network.

20 Claims, 8 Drawing Sheets

(51) Int. Cl.
*H04L 29/06* (2006.01)
*H04L 12/715* (2013.01)

(58) Field of Classification Search
CPC . H04L 45/748; H04L 67/2842; H04L 67/327; H04L 69/22
USPC .......................................................... 370/392
See application file for complete search history.

(56) References Cited

U.S. PATENT DOCUMENTS

| | | |
|---|---|---|
| 7,400,645 B2 | 7/2008 | Tsuchiya et al. |
| 8,694,675 B2 | 4/2014 | Wang et al. |
| 9,276,840 B2 | 3/2016 | Scott et al. |
| 9,282,050 B2 | 3/2016 | Mosko |
| 9,391,896 B2 | 7/2016 | Mosko |
| 9,451,032 B2 | 7/2016 | Scott et al. |
| 9,516,144 B2 | 12/2016 | Mosko et al. |
| 10,135,756 B2 | 11/2018 | Pfister et al. |
| 10,158,558 B1 | 12/2018 | Ward et al. |
| 2002/0002564 A1 | 1/2002 | Munetsugu et al. |
| 2003/0060240 A1 | 3/2003 | Graham et al. |
| 2004/0205247 A1 | 10/2004 | Ahn |
| 2007/0263864 A1 | 11/2007 | Buchen et al. |
| 2008/0172478 A1 | 7/2008 | Kiyohara et al. |
| 2008/0298458 A1 | 12/2008 | Yang et al. |
| 2010/0195655 A1 | 8/2010 | Jacobson et al. |
| 2011/0286470 A1 | 11/2011 | Dec et al. |
| 2012/0113986 A1 | 5/2012 | Shaffer et al. |
| 2013/0332619 A1 | 12/2013 | Xie et al. |
| 2015/0078377 A1 | 3/2015 | Wijnands et al. |
| 2015/0109902 A1 | 4/2015 | Kumar et al. |
| 2015/0113166 A1 | 4/2015 | Mosko |
| 2015/0131659 A1 | 5/2015 | Wijnands et al. |
| 2016/0119159 A1 | 4/2016 | Zhao et al. |
| 2016/0134535 A1 | 5/2016 | Callon |
| 2016/0182368 A1 | 6/2016 | Azgin et al. |
| 2016/0277201 A1 | 9/2016 | Thubert et al. |
| 2017/0237660 A1 | 8/2017 | Trossen et al. |
| 2017/0244667 A1 | 8/2017 | Maslak et al. |
| 2017/0302576 A1 | 10/2017 | Townsley et al. |
| 2018/0227230 A1* | 8/2018 | Azgin ................... H04L 45/745 |
| 2018/0278522 A1 | 9/2018 | Asati et al. |
| 2019/0199540 A1 | 6/2019 | Robitzsch et al. |

OTHER PUBLICATIONS

Definition from Techopedia, What is a 5-Tuple?, https://www.techopedia.com/definition/28190/5-tuple, downloaded from the internet on Jan. 26, 2017, 2 pages.
Daniel Dib, "Segment Routing: Potential for Far-Reaching Network Effects", Network Computing, http://www.networkcomputing.com/networking/segment-routing-potential-far-reaching-network-effects/516090694, Jun. 9, 2015, downloaded from the Internet on Jan. 24, 2017, 14 pages.
Wikipedia, "QUIC", https://en.wikipedia.org/wiki/QUIC, downloaded from the internet on Jan. 24, 2017, 4 pages.
R. Boivie, et al., "Explicit Multicast (Xcast) Concepts and Options", Network Working Group, RFC 5058, Nov. 2007, 35 pages.
Wikipedia, "Routing table", https://en.wikipedia.org/wiki/Routing_table, downloaded from the internet on Feb. 1, 2017, 4 pages.
Wikipedia, "IPv6", https://en.wikipedia.org/wiki/IPv6, downloaded from the internet on Jan. 24, 2017, 17 pages.
Iraj Sodagar, "Media presentation description and segment formats", MPEG, MPEG doc#: N11964, Mar. 2011, http://mpeg.chiariglione.org/slandards/mpeg-dash/media-presentation-descriplion-and-segment-formals, downloaded from the internet on Jan. 30, 2017, 11 pages.
Wikipedia, "Forwarding information base", https://en.wikipedia.org/wiki/Forwarding_information_base, downloaded from the internet on Feb. 1, 2017, 5 pages.
Wikipedia, "HTTP Live Streaming", https://en.wikipedia.org/wiki/HTTP_Live_Streaming, downloaded from the internet on Jan. 30, 2017, 16 pages.
IJ. Wijnands, Ed., et al., "Multicast using Bil Index Explicit Replication", draft-ielf-bier-architecture-05, Internet Engineering Task Force, Internet-Draft, Oct. 28, 2016, 36 pages.
M. Bishop, Ed., "Hypertext Transfer Protocol (HTTP) over QUIC", draft-ielf-quic-http-01, QUIC, Internet-Draft, Jan. 14, 2017, 25 pages.
C. Filsfils, Ed., et al., "Segment Routing Architecture", draft-ielf-spring-segment-routing-10, Network Working Group, Internet-Draft, Nov. 19, 2016, 29 pages.
P. Pfister, et al., "An IPv6 based BIER Encapsulation and Encoding", draft-pfister-bier-0ver-ipv6-01, Network Working Group, Internet-Draft, Oct. 31, 2016, 6 pages.
Diego Perino, et al., "A Reality Check for Content Centric Networking", ICN'11, Aug. 19, 2011, Toronto, Ontario, Canada, 6 pages.
Van Jacobson, et al., "Networking Named Content", CoNEXT 2009, Dec. 2009, Rome, Italy, 13 pages.
Dave Allan, et al., "A Framework for Computed Multicast applied to MPLS based Segment Routing", draft-allan-spring-mpls-multicast-framework-02, Spring Working Group, Internet Draft, Sep. 2016, 14 pages.
S. Previdi, Ed., et al., "IPv6 Segment Routing Header {SRH)", draft-ielf-6man-segment-routing-header-02, Network Working Group, Internet-Draft, Sep. 20, 2016, 29 pages.
T. Eckert, et al., "Traffic Engineering for Bil Index Explicit Replication BIER-TE", draft-eckert-bier-te-arch-02, Network Working Group, Internet-Draft, Oct. 18, 2015, 30 pages.
X. Xu, et al., "BIER Encapsulation", draft-xu-bier-encapsulation-03, Network Working Group, Internet-Draft, Oct. 13, 2015, 6 pages.
A. Delli, et al., "IP protocol suite extensions to support CON ET Information Centric Networking", draft-detti-conet-ip-option-05, Network Working Group, Internet-Draft, Jun. 20, 2013, 21 pages.
IJ. Wijnands, Ed., et al., "Encapsulation for Bit Index Replication in MPLS Networks", draft-ielf-bier-mpls-encapsulation-02, Internet Engineering Task Force, Internet-Draft, Aug. 31, 2015, 15 pages.
IJ. Wijnands, Ed., et al., "Multicast using Bil Index Explicit Replication", draft-ietf-bier-architecture-03, Internet Engineering Task Force, Internet-Draft, Jan. 19, 2016, 36 pages.
J. Hong, et al., "Bloom Filter-based Flat Name Resolution System for ICN", draft-hong-icnrg-bloomfilterbased-name-resolution-05.txt, ICNRG, Internet Draft, Oct. 19, 2015, 22 pages.
A. Detti, et al., "CON ET: A Content Centric Inter-Networking Architecture", ICN'11, Aug. 19, 2011, Toronto, Ontario, Canada, 6 pages.
IJ. Wijnands, Ed., et al., "Encapsulation for Bil Index Explicit Replication in MPLS and non-MPLS Networks", draft-ieft-bier-mpls-encapsulation-06, Internet Engineering Task Force, Internet-Draft, Dec. 9, 2016, 20 pages.
M. Gallo, et al., "Content-Centric Networking Packet Header Formal", drafl-ccn-packet-header-00, Internet Engineering Task Force, Internet-Draft, Jan. 26, 2015, 16 pages.
Christos Tsilopoulos, et al., "Reducing Forwarding State in Content-Centric Networks with Semi-Stateless Forwarding", IEEE INFOCOM 2014—IEEE Conference on Computer Communications, Apr. 27-May 2, 2014, Toronto, ON, Canada, 10 pages.
Van Jacobson, "Introduction to Content Centric Networking", FISS 09, Bremen, Germany, Jun. 22, 2009, 96 pages.
Cesar Ghali, et al., "Living in a PIT-LESS World: A Case Against Stateful Forwarding in Content-Centric Networking", arXiv:1512.07755v1, [cs.NI], Dec. 24, 2015, 10 pages.
B. Fenner, et al., "Protocol Independent Multicast—Sparse Mode (PIM-SM): Protocol Specification (Revised)", Network Norking Group, RFC 4601, Aug. 2006, 112 pages.
"Data Packet—NDN Packet Format Specification 0.2-2 documentation", https://named-dala.nel/doc/ndn-tlv/data.html, downloaded from the internet on Mar. 1, 2017, 3 pages.
S. Deering, et al., "Internet Protocol, Version 6 (IPv6)", Specification, Network Working Group, RFC 2460, Dec. 1998, 39 pages.
E. Rosen, et al., "MPLS Label Stack Encoding", Network Working Group, RFC 3032, Jan. 2001, 23 pages.

(56) References Cited

OTHER PUBLICATIONS

A. Adams, et al., "Protocol Independent Multicast—Dense Mode (PIM-DM): Protocol Specification (Revised)", Network Working Group, RFC 3973, Jan. 2005, 61 pages.

IJ. Wijnands, Ed., et al., "Multicast using Bit Index Explicit Replication", drafl-wijnands-bier-architecture-00, Internet Engineering Task Force, Internet-Draft, Sep. 22, 2014, 24 pages.

"Interest Packet—NDN Packet Format Specification 0.2-2 documentation", https://named-data.net/doc/ndn-tlv/interest.html, downloaded from the internet on Mar. 1, 2017, 5 pages.

Janos Tapolcai, et al., "Optimal False-Positive-Free Bloom Filter Design for Scalable Multicast Forwarding", IEEE/ACM Transactions on Networking, vol. 23, No. 6, Dec. 2015, 14 pages.

N. Kumar, et al., "BIER Use Cases", draft-ietf-bier-use-cases-04.txt, Network Working Group, Internet-Draft, Jan. 8, 2017, 17 pages.

A. Rahman, et al., "Deployment Configurations for Information-Centric Networks (ICN)", draft-rahman-icnrg-deployment-guidelines-00, ICNRG, Internet-Draft, Mar. 11, 2017, 17 pages.

International Search Report and Written Opinion in corresponding International Application No. PCT/US2018/022578, dated Jun. 7, 2018, 15 pages.

Thaler, D., "Multipath Issues in Unicast and Multicast Next-Flop Selection," Network Working Group RFC 2991, Nov. 2000; 9 pages.

Trotter, G., "Terminology for Forwarding Information Base (FIB) based Router Performance," Network Working Group 3222, Dec. 2001; 15 pages.

\* cited by examiner

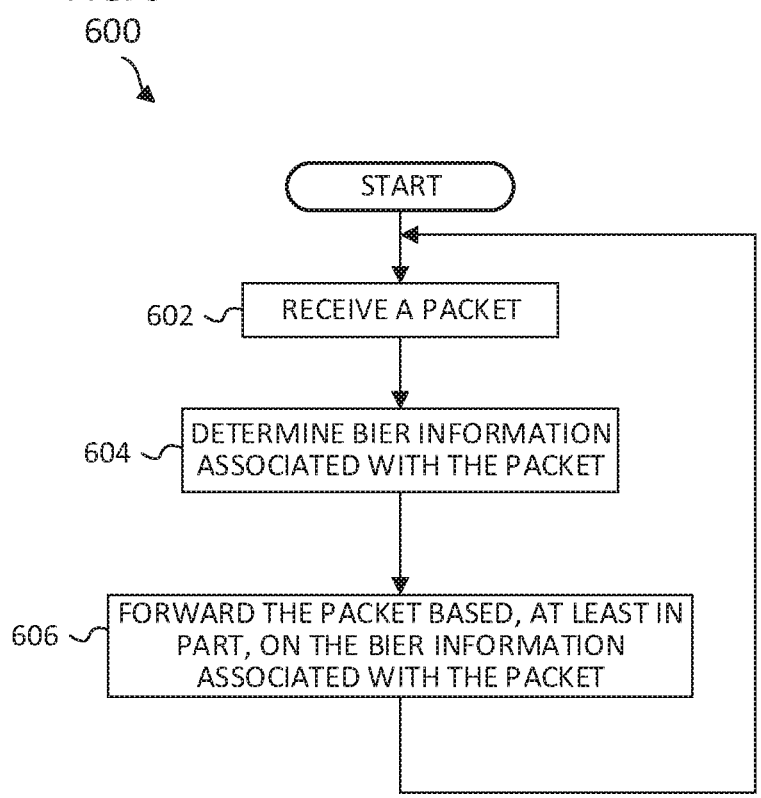

800

SYSTEM AND METHOD TO FACILITATE CONTENT FORWARDING USING BIT INDEX EXPLICIT REPLICATION (BIER) IN AN INFORMATION-CENTRIC NETWORKING (ICN) ENVIRONMENT

CROSS REFERENCE TO RELATED APPLICATION

This application is a continuation of U.S. application Ser. No. 15/469,306, filed Mar. 24, 2017, the entirety of which is incorporated herein by reference.

TECHNICAL FIELD

This disclosure relates in general to the field of computer networking, and more particularly, to a system and method to facilitate content forwarding using Bit Index Explicit Replication (BIER) in an Information-Centric Networking (ICN) environment.

BACKGROUND

Information-Centric Networking (ICN) represents a broad research direction for moving the Internet toward a content/information/data centric network architecture. At least some future network architecture possibilities for ICN are based on empirical research related to network usage and the desire to overcome problems with existing architectures such as Internet Protocol (IP) architectures. ICN and its specific architecture designs, such as Named Data Networking (NDN) and Content-Centric Networking (CCN), offer a fundamentally different approach in supporting information dissemination over any type of network. CCN and NDN represent content-based (or data-oriented) networking architectures rather than a host-oriented networking architecture. The flow of packets through a typical CCN or NDN network is based on the names of the content in the packets rather than numerically addressed hosts. Packet forwarding for ICN network architectures presents significant challenges to traffic engineers and administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified flow diagram illustrating example operations that can be associated with packet forwarding for a BIER enabled ICN forwarder in accordance with at least one embodiment of the communication system;

DETAILED DESCRIPTION OF EXAMPLE EMBODIMENTS

Overview

Figure 1:
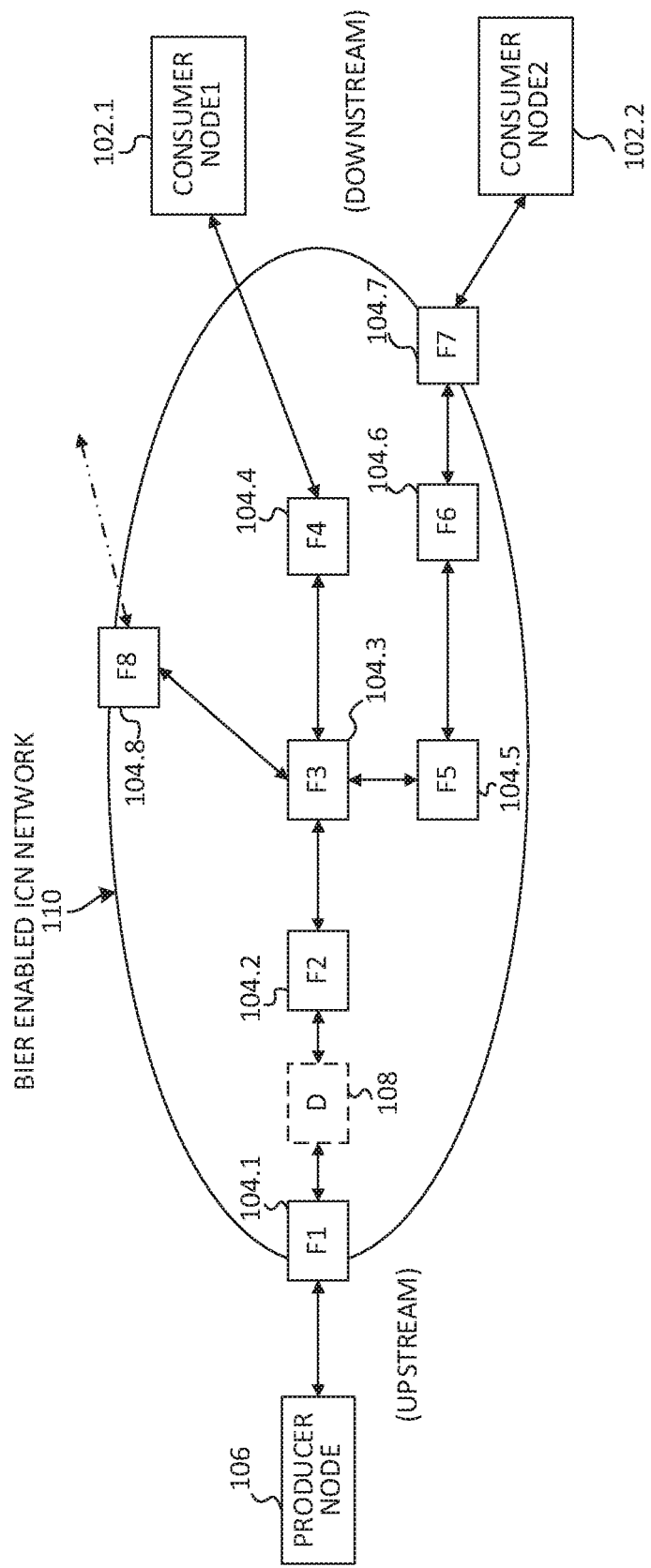
FIG. 1 is a simplified block diagram of a communication system in which content forwarding using Bit Index Explicit Replication (BIER) can be implemented for an Information-Centric Networking (ICN) environment according to at least one embodiment of the present disclosure.

A method is provided in one example embodiment receiving a packet by a forwarder in an Information-Centric Networking (ICN) network; determining Bit Index Explicit Replication (BIER) information associated with the packet; and forwarding the packet based, at least in part, on the BIER information associated with the packet.

In some instances, the packet can be an ICN specific interest packet conveying an interest for a piece of content and the method can further include determining whether a BIER Type-Length-Value (TLV) is included within the interest packet; and including a BIER TLV in the interest packet with the BIER TLV having an identifier that is associated with the forwarder based on a determination that no BIER TLV is included with the interest packet; and performing a Pending Interest Table (PIT) update by the forwarder. In still some instances, the packet can be an interest packet and the method can further include determining whether the forwarder is able to store content associated with the interest packet. In some cases, the method can include not performing a Pending Interest Table (PIT) update by the forwarder based on a determination that the forwarder is not able to store content associated with the interest packet and, in other cases, the method can include performing a Pending Interest Table (PIT) update by the forwarder and including a BIER Type-Length-Value (TLV) in the interest packet having an identifier that is associated with the forwarder or appending a BIER TLV in the interest with an identifier that is associated with the forwarder based on a determination that the forwarder is to store content associated with the interest packet.

In various instances, determining whether the forwarder is able to store content requested by the interest packet can include at least one of: determining whether at least one policy configured for the forwarder prohibits the forwarder to store content associated with data packets; determining whether the forwarder is configured with a content store; and determining whether a content store configured for the forwarder is full.

In still other instances, the packet can be an interest packet and the method can further include determining whether content associated the interest packet is stored at the forwarder. In some cases, the method can include forwarding the interest packet to another forwarder or to a producer node based on a determination that no content associated with the interest packet is stored at the forwarder. In other cases, the method can include generating a data packet based on a determination that content associated with the interest packet is stored at the forwarder and forwarding the data packet toward the one or more other forwarders or to one or more consumer nodes based on its PIT forwarding table.

In still other instances, the packet can be a data packet and the method can further include identifying one or more bits set in a BIER header for the data packet, wherein each of the one or more bits are associated with one or more other forwarders that are to receive the data packet; determining whether the data packet is to be forwarded along diverging paths in order to reach each of the one or more other forwarders; replicating the data packet based on a determination that the data packet is to be forwarded along diverging paths, wherein the replicating generates at least two replicated data packets; resetting one or more bits in a BIER header of each replicated data packet based on one or more forwarders that are to receive each replicated packet; and forwarding each replicated data packet along the diverging paths.

In some cases, data packet forwarding can include forwarding the data packet to one of another forwarder or a consumer node that is to receive the packet based on a determination that the data packet is not to be forwarded along diverging paths. In still some cases, data packet forwarding can include removing the BIER header from the data packet before the forwarding based on a determination that the forwarder is a last hop forwarder for the data packet.

Example Embodiments

Referring to FIG. 1, FIG. 1 is a simplified block diagram illustrating example details associated with a communication system 100 in which content forwarding using Bit Index Explicit Replication (BIER) can be implemented for an Information-Centric Networking (ICN) environment according to one embodiment of the present disclosure. FIG. 1 includes a number of consumer nodes, a first consumer node (consumer node1) 102.1 and a second consumer node (consumer node2) 102.2 and a producer node 106 which can communicate over a BIER enabled ICN network 110 using one or more BIER enabled ICN forwarders (F1-F8) 104.1-104.8. BIER enabled ICN forwarders can be referenced herein using 'F' labels (e.g., F1-F8). Although only two consumer nodes 102.1-102.2, one producer node 106 and eight BIER enabled ICN forwarders 104.1-104.8 are illustrated in communication system 100, it should be understood that any number of consumer nodes, producer nodes and/or BIER enabled ICN forwarders can be deployed in communication system 100 depending on needs and/or implementations. In some embodiments, one or more forwarders may be present in BIER enabled ICN network 110 that may be BIER disabled and/or incapable of performing BIER forwarding, such as, for example BIER disabled/incapable ICN forwarder 108 (labeled herein as 'D'). As referred to herein in this Specification, the terms 'router' and 'forwarder' can be used interchangeably.

Generally, communication system 100 can include one or more networks, such as BIER enabled ICN network 110, which represent a series of points or nodes (e.g., BIER enabled ICN forwarders) of interconnected communication paths for receiving and transmitting messages (e.g., packets) that propagate through the one or more networks. These nodes can offer communicative interfaces between nodes. Each node (e.g., consumer node 102.1-102.2, producer node 106 and BIER enabled ICN forwarders F1-F8 104.1-104.8) can be configured with a number of interfaces through which communications (e.g., packets) can be exchanged with one or more other node(s).

In general, the term 'interface' can be associated with protocol and application based interfaces as well as hardware network interfaces. Protocol and application based interfaces can include, but not be limited to, Internet Protocol (IP), User Datagram Protocol (UDP) UDP, Transmission Control Protocol (TCP), Multiprotocol Label Switching (MPLS), Segment Routing (SR), tunneling protocols such as Generic Routing Encapsulation (GRE), Point-to-Point Tunneling Protocol (PPTP), Layer Two Tunneling Protocol L2TP), etc. Hardware network interfaces can include, but not be limited to, Ethernet, Fibre Channel, Institute of Electrical and Electronics Engineers (IEEE) Std 802.11, etc.

The number of interfaces illustrated for each node of the embodiment of FIG. 1 is provided for illustrative purposes only and is not meant to limit the broad scope of the present disclosure. Nodes of communication system 100 can be provisioned with any number of interfaces depending on needs and/or implementations in accordance with various embodiments described herein.

For the embodiment of FIG. 1, producer node 106 can interface with F1 104.1, which can further interface with F2 104.2. F2 104.2 can further interface with F3 104.3, which can further interface with F4 104.4, F5 104.5 and F8 104.8. F4 104.4 can further interface with first consumer node 102.1. F5 104.5 can further interface with F6 104.6, which can further interface with F7 104.7. F7 104.7 can further interface with second consumer node 102.2. F8 104.8 can further interface with other nodes (not shown) of BIER enabled ICN network 110 and/or other networks as may be deployed based on various needs and/or implementations in accordance with various embodiments of communication system 100. In at least one embodiment, F1 can interface with BIER disabled/incapable ICN forwarder D 108, which can interface with F2 104.2

It should be understood that the interfaces illustrated for the embodiment of FIG. 1 are provided for illustrative purposes only and are not meant to limit the broad scope of the present disclosure. Nodes of communication system 100 can be interconnected via any number of interfaces depending on needs and implementations in accordance with various embodiments described herein.

For purposes of illustrating certain example techniques of packet forwarding embodiments in communication system 100, it is important to understand typical communications that can traverse ICN network architectures. The following foundational information may be viewed as a basis from which the present disclosure may be properly explained. Such information is offered earnestly and for teaching purposes only and, therefore, should not be construed in a way to limit the broad applications and teachings of the present disclosure.

Information-Centric Networking (ICN) is a new network architecture that differs radically from Internet Protocol (IP) architectures. ICN architectures involve a content/information/data centric network architecture. Content-Centric Networking (CCN), Named Data Networking (NDN) and variations thereof (e.g., CCNx® as developed by the Palo Alto Research Center (PARC), now acquired by Cisco Systems, Inc.) are examples of ICN architectures, each of which can be used as the underlying architecture for implementing BIER enabled packet forwarding embodiments described herein. CCN, CCNx and NDN are based on a premise that the flow of messages through a network is based on the name of the content of the messages.

Communication in a typical ICN network is typically driven by consumers (e.g., consumer nodes) that initiate requests for information through the exchange of messages. In NDN and CCN protocols, there are two basic messages, an Interest message (e.g., an Interest packet), which requests a piece of content via a hierarchical tokenized name, and a Data message (e.g., a Data packet), which returns the requested named piece of data (e.g., the requested content). In a typical ICN network, names are the only identifiers in the protocols; neither source addresses nor destination addresses are employed. As referred to herein in this Specification, the terms 'Data', 'Content', 'Data packet', 'Data message', 'Content packet' and 'Content Message' can be used interchangeably. Further as referred to herein in this Specification, the terms 'Interest', 'Interest packet', 'Interest message', 'Request', 'Request packet' and 'Request message' can be used interchangeably.

A name-prefix allows content to be referenced by name in Interest and Data packets. The name-prefix is hierarchical and carries semantic information. An ICN name is a hierarchical tokenized name for content and contains a sequence of name components. For example, /com/youtube/<mediaID>/audio/<frameID>/<segment#> contains six name components with each name component being delineated by a slash 'l'. As illustrated by the <segment#> name component, content can span multiple segments or chunks.

For a data item (e.g., content) to be globally accessible, the data item is assigned a globally unique name. When a client (also referred to herein as 'consumer' or 'recipient') wants particular content, the client can generate an Interest packet that includes the name of the desired content. In at least some instances, the name of the requested content may be provided by a user or process that intends to consume the content. In a typical ICN network, a forwarder receiving an Interest packet can perform matching operations to determine whether the content is stored at the node or whether the Interest needs to be forwarded to another node. The Interest packet can be forwarded along one or more path(s) for any interface(s) associated with matching operations performed on the content name.

As noted, forwarders typical ICN networks use the name to forward an Interest packet toward the desired content. The desired data may be found at a particular source (also referred to herein as 'producer') that produced the content or at another intermediate forwarder along a path to the source. For example, a forwarder between the source and the client may have stored the content stored thereat if the content passed through the node one or more times. When an Interest packet reaches a node that contains the desired content (e.g., either a producer node or an ICN forwarder along a path to the producer node), the node can generate a Data packet that includes the content name and the desired content. To reach the consumer, the Data packet follows the reverse path taken by the Interest packet. It should be noted that producer nodes can be considered consumer nodes if they desire content from another source and consumer nodes can be producer nodes if they have content stored that is requested by another node.

In a typical ICN network, Interest and Data packets travel hop-by-hop (e.g., Interest packets travel 'upstream' hop-by-hop toward a source carrying name(s) of content chunk(s) being requested and Data packets travel 'downstream' toward consumer(s) that requested the content chunks(s)). A typical forwarder in a typical ICN network uses three different forwarding data structures: (1) a Pending Interest Table (PIT), which is a table that stores the state associated with unsatisfied Interests (e.g., an entry is added into the PIT when a new Interest packet arrives and the entry is removed when it is satisfied by a corresponding Data packet); (2) a Content Store (CS) is a buffer and/or cache contained within one or more memory element(s) and/or other storage that stores content associated with previously processed Data packets, in case they are re-requested; and (3) a Forwarding Information Base (FIB) fills an analogous role as with IP architectures in that it is used to ascertain next hop information for forwarding Interest packets based on an exact match or a Longest Prefix Match (LPM) of a content name contained in an Interest packet.

Similar to IP multicast, the typical ICN architecture requires that state, referred herein as a PIT entry, being created on any node that may not have requested content object cached or stored locally so as to ensure downstream traffic forwarding. Unfortunately, this means that nodes must have to create a PIT state even if they can't and/or don't cache the requested content. This goes against scalable design and deployment techniques, in which every node may not maintain a content store, may be provisioned with one or more policies that indicate not caching content and/or may have a full content storage space. Unnecessary usage of maintaining PIT entries by such nodes that can't cache and/or don't desire to cache content makes forwarding for typical ICN architectures suboptimal and can create scalability issues as related to PIT entries.

According to embodiments described herein, producer node 106, consumer nodes 102.1-102.2 and BIER enabled ICN forwarders F1-F8 104.1-104.8 can be enhanced to combine BIER and ICN technologies to provide forwarding over BIER enabled ICN network 110 in a manner allows ICN architectures to take advantage of BIER constructs to provide optimal Interest and Data packet forwarding within communication system 100. In accordance with at least one embodiment, communication system 100, via BIER enabled ICN network 110 provides for forwarders to store content, if they intend to, or not, if they cannot or don't intend to store content. For instances in which a forwarder cannot or doesn't intend to store content, the forwarder can leverage BIER stateless forwarding to forward packets, thereby helping to eliminate unnecessary usage of the PIT. For embodiments described herein, the term 'upstream' will be used in reference to Interest packet forwarding and the term 'downstream' will be used in reference to Data packet forwarding.

A brief discussion of forwarding in a BIER enabled network is provided; however, this discussion is not meant to limit the broad scope of the teachings of the present disclosure. BIER is an innovative technology that continues to gain momentum in delivering content, which can include but not be limited to, IP Television (IPTV) content, financial information, etc. in various types of networks (e.g., service provider, enterprise, IPv6 low power wireless personal area networks (6LoWPAN), etc.) In a typical BIER deployment, BIER control-plane protocols can be used within a 'BIER domain' such that forwarders in the BIER domain can perform forwarding operations based on BIER constructs, such as, for example, a BIER header, a Bit Index Routing Table (BIRT), a Bit Index Forwarding Table, etc. as defined in Internet Engineering Task Force (IETF) 'draft-ietf-bier-architecture-05' or the like as may be defined by the IETF.

Each forwarder in a BIER domain can be assigned a Bit-Forwarding Router Identifier (BFR-ID), also sometimes referred to as a 'BIER node ID', which can be associated with a unique positive integer identifying each forwarder in the BIER domain. In some cases, a BIER domain can be divided into sub-domains in which each forwarder in each BIER sub-domain is assigned a unique BFR-ID.

In general, BIER forwarding can involve including a BIER header with packets traversing a BIER enabled network. Among other information, the BIER header can include a BIER BitString. Each bit position in the BIER BitString can be associated with a BFR-ID identifying destination node(s) to which packets are to be delivered. When a BIER-capable forwarder in a BIER enabled network deployment receives a packet including a BIER header, the forwarder performs a forwarding lookup using its BIFT, which can include one or more Forwarding Bit Mask(s) that can be used to determine next-hop neighbor(s) to which packet(s) are to be forwarded in order to reach certain destinations. If replication is needed for diverging paths, the forwarder can replicate the packet, reset bit(s) in the BIER bitmap based on the destinations to which it is to forward the replicated packets and forward the packets toward the destinations. A BIER header can include other information such as, for example, a BIFT identifier, a Time To Live (TTL) field, a Traffic Class (TC) field and/or other various information as may be prescribed by the IETF.

A typical BIER enabled network can include: Bit-Forwarding Ingress Routers (BFIRs) that can receive packets from node(s) outside the BIER domain and forward the packets to other node(s) within the domain; Bit-Forwarding Egress Routers (BFERs) which can receive packets from within the BIER domain and forward the packets to node(s) outside the BIER domain; and transit routers, which can forward packets to neighboring routers in the BIER domain. In some cases, depending on the direction of packets, a BIER-capable router/forwarder can be both a BFIR and a BFER. In a typical BIER enabled network, BFIRs receive packets, determine BFER destination(s) to which the packets are to be delivered, set bits in the BIER BitString that identify these BFER(s) and forward the packets toward the BFER(s).

In at least one embodiment, BIER forwarding techniques can be provisioned for BIER enabled ICN network 110 within communication system 100 such that each forwarder F1-F8 104.1-104.8 (and any others that may be deployed depending on needs and/or implementations) can be enhanced to utilize BIER constructs to perform Interest and Data packet forwarding in a manner that reduces unnecessary PIT interactions based on certain conditions, discussed in further detail below. Accordingly, various embodiments of communication system 100 can provide a system and method to avoid unnecessary usage of the PIT at one or more BIER enabled ICN forwarders within BIER enabled ICN network 110.

Each BIER enabled ICN forwarder F1-F8 104.1-104.8 can be assigned a BFR-ID. For the purposes of embodiments described herein, the BFR-ID is assumed to correspond to the numerical portion identifying each forwarder (e.g., 1, 2, 3, etc.) such that the BFR-ID for each BIER enabled ICN forwarder F1-F8 104.1-104.8 can be represented as a bit string in which a corresponding bit position in the bit string is set that corresponds to the BFR-ID for each forwarder. For example, the BFR-ID for BIER enabled ICN forwarder F1 104.1 can be represented as (00000001), the BFR-ID for BIER enabled ICN forwarder F2 104.2 can be represented as (00000010), the BFR-ID for BIER enabled ICN forwarder F3 104.3 can be represented as (00000100), and so on for the other BIER enabled ICN forwarders F4-F8 104.4-104.8.

BIER enabled ICN forwarders F1-F8 104.1-104.8 within BIER enabled ICN network 110 can perform operations as ingress, transit or egress forwarders based on various conditions associated with packets received by the forwarders. A BIER enabled ICN forwarder within BIER enabled ICN network 110 can perform forwarding operations as a BFIR that encapsulates a Data packet with a BIER header if it has content stored that is requested using an Interest packet received by the forwarder. In at least one embodiment, a BIER header can be configured to carry a BIER BitString in which one or more bit(s) can be set as discussed for various embodiments described herein.

A BIER enabled ICN forwarder within BIER enabled ICN network 110 can also decapsulate a BIER header from a received Data packet if it determines that it is the last hop before forwarding the Data packet to a consumer or to a BIER disabled/incapable forwarder. In some embodiments, producer node 106 and/or consumer node(s) 102.1, 102.2 can be enhanced to perform BFIR forwarding operations.

A BIER enabled ICN forwarder within BIER enabled ICN network 110 can perform forwarding operations as a BFER if it receives an Interest packet that contains a BIER Tag-Length Value (TLV) element or format in which the BIER BitString has no BFR-IDs identified (e.g., all the bits are set to 0), if it receives an Interest packet having no BIER TLV, or if it receives a Data packet in which only the forwarder itself is identified in the BIER BitString contained in a BIER header for the Data packet (e.g., the forwarder is a last hop forwarder before the Data packet is to be sent to a consumer). Generally, a TLV element or format includes a Type field, a Length field and a Value field. In one embodiment, the Type field can identify a type of data that is carried in the Value field, the Length field can identify the length of the data carried in the Value field, and the Value field can contain the data that is to be processed.

A forwarder within BIER enabled ICN network 110 can perform operations as a transit forwarder if it receives an Interest packet or a Data packet and does not desire to (e.g., based on policy) or cannot store (e.g., does not have a content store or has a full content store) content that is to be received for the Interest.

As noted above, PIT interactions for one or more forwarder(s) within BIER enabled ICN network 110 can be limited during operation based on certain conditions, which are outlined below, that can be associated with BIER information associated with packets.

Condition 1) If a BIER enabled ICN forwarder receives an Interest packet, does have a content store, does not currently have the content stored and does desire to store content associated with the Interest, then the forwarder updates its PIT and appends its own BFR-ID in the BIER TLV for the Interest and forwards the packet upstream based on a lookup on its FIB using the name-prefix included in the Interest.

Condition 2) If a BIER enabled ICN forwarder receives an Interest packet, does have a content store, does not currently have the content stored and does not desire to store or cannot store content associated with the Interest, then the forwarder determines whether there are any existing BFR-IDs identified in BIER TLV for the Interest (e.g., whether any bits are set in the BIER BitString contained in the BIER TLV) or whether there is no BIER TLV at all for the Interest and performs operations as follows:

(a) If there are no existing BFR-IDs identified in the BIER TLV for the Interest or if there is no BIER TLV at all for the Interest, the forwarder assumes itself to be at the ICN and BIER boundary and performs egress forwarding operations (e.g., as a BFER) in which the forwarder includes a BIER TLV in the Interest packet such that the BIER TLV includes its BFR-ID set in the BIER BitString, updates its PIT and forwards the packet upstream based on a lookup on its FIB using the name-prefix included in the Interest; or (b) If there is at least one other BFR-ID identified in a BIER TLV for the Interest, then the forwarder performs transit forwarding operations in which the forwarder does not update its PIT, does not append its BFR-ID to the BIER TLV and forwards the Interest packet upstream based on a lookup on its FIB using the name-prefix included in the Interest.

Condition 3) If a BIER enabled ICN forwarder receives an Interest packet and does not have a content store, the forwarder determines whether there are any existing BFR-IDs identified in a BIER TLV for the Interest or whether there is no BIER TLV at all for the Interest and performs operations as follows:

(a) If there are no existing BFR-IDs identified in the BIER TLV for the Interest or if there is no BIER TLV at all for the packet, the forwarder assumes itself to be at the ICN and BIER boundary and performs egress forwarding operations in which the forwarder includes a BIER TLV in the Interest such that the BIER TLV includes its BFR-ID set in the BIER BitString, updates its PIT and forwards the Interest packet upstream based on a lookup on its FIB using the name-prefix included in the Interest; or (b) If there is at least one other BFR-ID identified in a BIER TLV for the Interest, then the forwarder performs transit forwarding operations in which the forwarder does not update its PIT, does not append its BFR-ID to the BIER TLV and forwards the packet upstream based on a lookup on its FIB using the name-prefix included in the Interest.

Eventually, an Interest packet will be forwarded to a BIER enabled ICN forwarder or anchor (e.g., a producer node) that has the requested content stored thereat. Based on a determination that requested content is stored at particular BIER enabled ICN forwarder or producer node, the forwarder or node can determine whether at least one BFR-ID is identified in the BIER TLV for the received Interest. The forwarder may not update its PIT for the requested content.

If a forwarder or node that has requested content stored, determines that at least one BFR-ID is identified in the BIER TLV for a received Interest packet, the forwarder or node can generate a Data packet including the requested content, can encapsulate the Data packet with a BIER header having selective forwarder(s) identified in the header based on a lookup on its BIFT with Forwarding Bit Masks applied for the forwarder(s) that are to receive the Data packet that are identified in the BIER TLV of the received Interest and can forward the Data packet downstream towards the forwarder(s) and the original consumer(s) that requested the content.

If a forwarder or node that has requested content stored, determines that no BFR-ID is identified in the BIER TLV for a received Interest packet or if there is no BIER TLV included for the Interest, the forwarder or node can perform ICN forwarding operations based on a lookup on its FIB using the namespace included in the Interest in which the forwarder or node can generate a Data packet including the requested the content and can forward the Data packet downstream towards the original consumer(s) that requested the content. Thus, in at least one embodiment, communication system 100 maintains backwards compatibility with non-BIER enabled ICN architectures. Subsequent Interest packets received for a same content can follow similar operations up to a forwarder that has the content stored thereat.

Various advantages can be realized in accordance with various embodiments of the system and method provided by communication system 100. In at least one embodiment, the system and method provided by communication system 100 including BIER enabled ICN network 110 can provide one advantage in that ICN forwarding constructs (e.g., mid-network caching, as needed) can be preserved. In at least one embodiment, the system and method provided by communication system 100 including BIER enabled ICN network 110 can provide another advantage by allowing ICN and BIER technologies to complement each other (e.g., to use ICN forwarding and/or to use BIER forwarding based on various conditions) throughout a network. In at least one embodiment, the system and method provided by communication system 100 including BIER enabled ICN network 110 provide yet another advantage by enabling optimal and simpler migration into ICN architectures in a backward as well as forward compatible manner (e.g., excluding BFR-ID(s) from packets can provide for typical ICN forwarding). In at least one embodiment, the system and method provided by communication system 100 including BIER enabled ICN network 110 provide yet another advantage by eliminating PIT churn (e.g., unnecessary usage of the PIT) by those nodes that don't want to cache or can't cache content (e.g., based on policy, not having a content store, having a full content store, etc.) for ICN networks. In at least one embodiment, the system and method provided by communication system 100 including BIER enabled ICN network 110 provide yet another advantage by increasing the stability of ICN networks and making such networks more secured.

Figure 2:
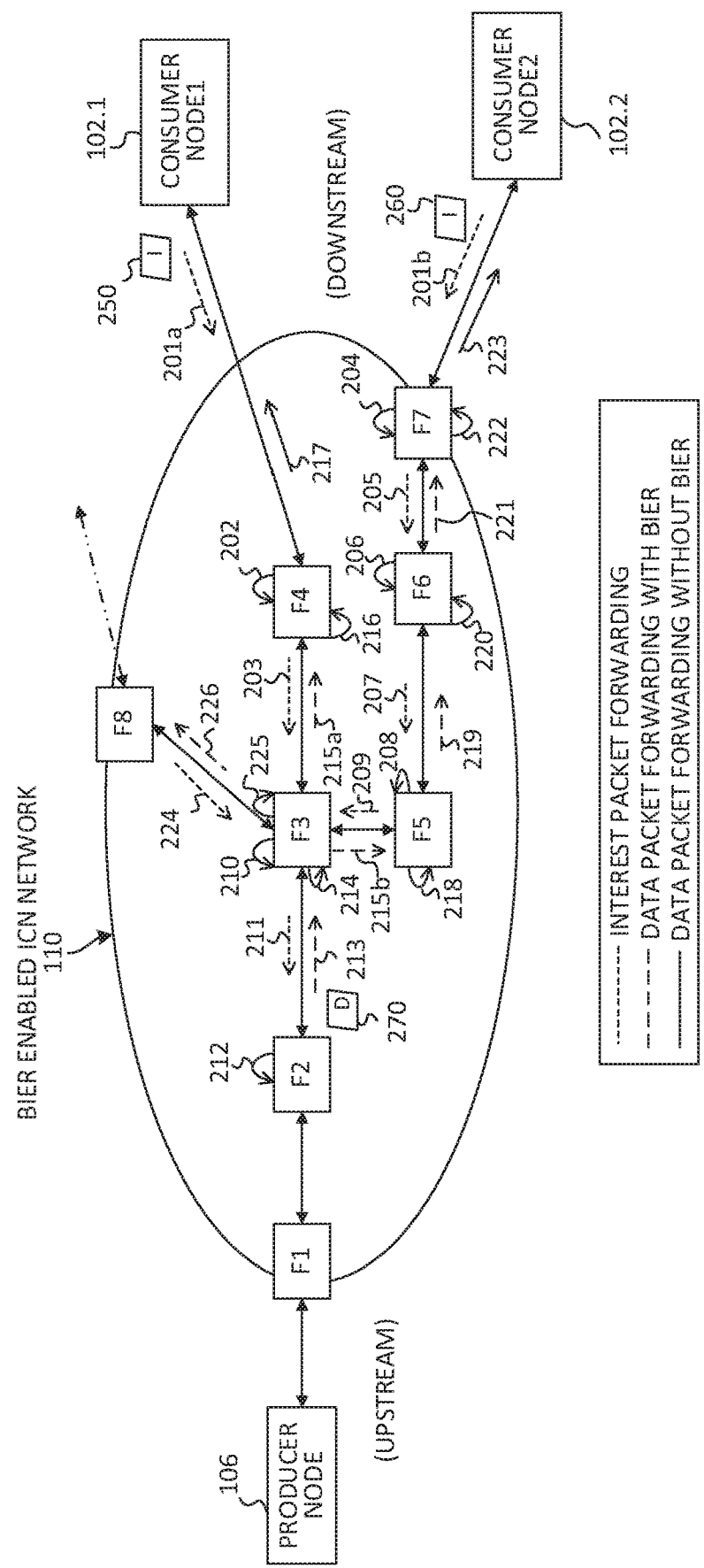
FIG. 2 is a simplified block diagram illustrating example operations and interactions that can be performed to facilitate packet forwarding in accordance with one potential embodiment of the communication system.

Referring to FIG. 2, FIG. 2 is a simplified block diagram 200 illustrating example operations and interactions that can be performed to facilitate packet forwarding in accordance with one potential embodiment of the communication system. FIG. 2 includes consumer nodes 102.1-102.2, BIER enabled ICN forwarders F1-F8 104.1-104.8, and producer node 106.

For the embodiment of FIG. 2, it is assumed that each respective BIER enabled ICN forwarder F1-F8 104.1-104.8 is configured with a respective BFR-ID that corresponds to the number by which it is labeled (e.g., 1, 2, 3, etc.). For example, BIER enabled ICN forwarder F1 104.1 can be configured with a BFR-ID of (00000001), BIER enabled ICN forwarder F2 104.2 can be configured with a BFR-ID of (00000010), BIER enabled ICN forwarder F3 104.3 can be configured with a BFR-ID of (00000100) and so on for BIER enabled ICN forwards F4-F8 104.4-104.8. In various embodiments, BFR-IDs can be configured manually for BIER enabled ICN forwarders by a network operator or service provider or can be configured automatically based on logic, applications, etc. configured for BIER enabled ICN forwarders.

To illustrate various features of communication system 100, it is further assumed for the embodiment of FIG. 2 that: each respective BIER enabled ICN forwarder F1-F8 104.1-104.8 is configured with a respective content store; each BIER enabled ICN forwarder F1-F8 104.1-104.8 is configured with a Bit Index Forwarding Table (BIFT), which enables BIER forwarding by each forwarder; that each respective consumer node 102.1-102.2 injects a respective Interest packet into BIER enabled ICN network 110 at around the same time (e.g., within a few seconds of each other) that identifies a same content requested by each consumer node; that the content associated with the content-name identified in the Interest packets is stored at BIER enabled ICN forwarder F2 104.2; that BIER enabled ICN forwarder F4 104.4 and BIER enabled forwarder F3 104.3 desire to store content; and that BIER enabled ICN forwarders F5-F7 104.5-104.7 do not desire to store content.

The use and structure of a BIFT is defined in 'draft-ietf-bier-architecture-05', published October 2016. In general, a BIFT for a given BIER enabled ICN forwarder can include a number of entries in which each entry is associated with a potential BIER enabled ICN forwarder destinations toward which Data packets can potentially be forwarded by the given BIER enabled ICN forwarder. Each entry of a BIFT can include the BFR-ID of a particular destination BIER enabled ICN forwarder, a neighbor on the path to each destination forwarder and a Forwarding Bit Mask (F-BM) associated with forwarding packets toward each potential destination. An example BIFT that may be configured for BIER enabled ICN forwarder F2 104.2 for the embodiment of FIG. 2 is shown below.

TABLE 1

EXAMPLE BIFT FOR BIER ENABLED ICN FORWARDER F2

| BFR-ID | F-BM | NEIGHBOR |
|---|---|---|
| 3 (00000100) | 10111100 | F3 |
| 4 (00001000) | 10111100 | F3 |
| 5 (00010000) | 10111100 | F3 |
| 6 (00100000) | 10111100 | F3 |
| 7 (01000000) | 10111100 | F3 |
| 8 (10000000) | 10111100 | F3 |

In general, a BIER enabled ICN forwarder can perform a lookup on its BIFT to determine the F-BM(s) to which a packet (or potentially replicated packets) is/are to be forwarded and can perform a logical AND operation using the F-BM(s) and the BFR-ID(s) for the forwarder(s) toward which packet(s) are to be forwarded to determine the BIER BitString to include in BIER header(s) with each packet(s).

Beginning at 201*a*, it is assumed for the embodiment of FIG. 2 that consumer node 102.1 injects an Interest packet 250 having no BIER TLV into BIER enabled ICN network 110 toward BIER enabled ICN forwarder F4 104.4. Around the same time, it is assumed for the embodiment of FIG. 2 that consumer node 102.2 injects (201*b*) an Interest packet 260 having no BIER TLV into BIER enabled ICN network 110 toward BIER enabled ICN forwarder F4 104.4. [Note, for the remainder of the embodiment of FIG. 2, BIER enabled ICN routers may be referenced using their 'F' labels].

At 202, F4 determines that it is to store content associated with the received Interest and therefore updates its PIT, includes a BIER TLV with the Interest such that the BIER TLV has a BIER BitString set to its BFR-ID (00001000), and forwards (203) the Interest packet further upstream to F3 based on a FIB lookup using the name-prefix included in the Interest packet. It is important that BIER enabled ICN forwarders to append their BFR-IDs to a BIER BitString of a BIER TLV rather than overwriting any BFR-IDs contained in the BitString to ensure proper downstream Data packet forwarding. For example, Data packet forwarding may be disrupted for BIER enabled ICN forwarders that may be multiple hops away from a content source and are to store content associated with an Interest.

Turning to Interest packet 260, F7 receives the Interest and performs operations (204) in which F7 determines that, even though it is not to store content associated with the Interest for the present embodiment, there is no BIER TLV included with the Interest. Thus, F7 includes a BIER TLV in the Interest having a BIER BitString set to its BFR-ID (01000000), updates its PIT, and forwards (205) the Interest further upstream to F6 based on a FIB lookup using the name-prefix included in the Interest packet. F6 receives the Interest packet and performs operations (206) in which F6 determines that it is not to store content associated with the Interest and that there is a BIER TLV included in the Interest having at least one bit set. F6 therefore does not update its PIT, does not append its BFR-ID to the BIER BitString for the BIER TLV, and forwards (207) the Interest further upstream to F5 based on a FIB lookup using the using the name-prefix included in the Interest packet. F5 receives the Interest packet and performs operations (208) in which F5 determines that it is not to store content associated with the Interest and that there is a BIER TLV included in the Interest having at least one bit set. F5 therefore does not update its PIT, does not append its BFR-ID to the BIER BitString for the BIER TLV, and forwards (209) the Interest further upstream to F3 based on a FIB lookup using the using the name-prefix included in the Interest packet.

It is assumed for the embodiment of FIG. 2 that F3 receives the Interest packets 250 and 260 that were injected into the BIER enabled ICN network 110 from consumer nodes 102.1-102.2 at around the same time (e.g., within a few seconds of each other). F3 performs operations (210) in which F3 determines that it is to store the content, merges the BIER BitStrings contained in the BIER TLVs for each received packet to generate a single BIER TLV, appends the header with its BFR-ID (00000100) to form a BIER BitString of (01001100), and forwards (211) the Interest packet to F2. In one embodiment, merging multiple BIER BitStrings can include performing a bitwise logical OR operation with each BIER BitString for each BIER TLV received for each Interest packet to generate a single BIER BitString.

F2 receives the Interest packet and performs operations (212) in which F2 determines that it has the content stored that is associated with the name-prefix contained in the Interest packet, generates a Data packet 270, encapsulates the Data packet with a BIER header that includes the same BIER BitString bits set (01001100) as were set in the received BIER TLV for the Interest and forwards (213) the Data packet based on a lookup on the F2 BIFT to forward the Data packet to F3. F3 receives the Data packet and performs operations (214) in which F3 consumes (e.g., caches) the content, performs a BIFT lookup using the BIER BitString in the BIER header to determine that the Data packet is to be forwarded along two diverging paths in order to reach each destination (e.g., F4 and F7), and replicates the Data packet to generate two replicated Data packets. For the replicated Data packet to be forwarded to F4, F3 sets the BIER BitString to (00001000) based on the F3 BIFT lookup. For the replicated Data packet to be forwarded toward F7, F3 sets the BIER BitString to (01000000) based on the F3 BIFT lookup.

F3 forwards (215*a*) the F4 Data packet to F4 and forwards (215*b*) the F7 Data packet to F5. The F4 Data packet is received by F4, which does not cache the content (recall, F4 does not desire to store content for the embodiment of FIG. 2). F4 performs operations (216) in which F4 performs a PIT lookup using the name-prefix contained in the Data packet, updates the PIT, determines that it is a last hop forwarder (e.g., the only bit set in the BIER BitString is the BFR-ID for F4), decapsulates (e.g., removes) the BIER header from the Data packet and forwards (217) the Data packet to consumer node 102.1 using ICN forwarding techniques.

Turning to F5, F5 receives the Data packet and performs operations (218) in which F5 determines that it does not desire to store the content and performs a BIFT lookup using BIER BitString to determine that it is not the last hop forwarder for the packet, that the next-hop neighbor is F6, and forwards (219) the Data packet to F6. F6 receives the Data packet and performs operations (220) in which F6 determines that it does not desire to store the content, performs a BIFT lookup using the BIER BitString to determine that it is not the last hop forwarder for the packet and that the next-hop neighbor is F7, and forwards (221) the Data packet to F7. F7 receives the Data packet and performs operations (222) in which F7 performs a PIT lookup using the name-prefix contained in the Data packet, determines that it is the last hop router for the Data packet, updates its PIT, decapsulates the BIER header from the Data packet, caches the content (recall, F7 does desire to store content for the embodiment of FIG. 2), and forwards (223) the Data packet to consumer node 102.1 using ICN forwarding techniques.

In some cases, BIER disabled/incapable ICN forwarders may receive Interest or Data packets that contain BIER routing information (e.g., BIER disabled/incapable ICN forwarder D 108). In such cases, the BIER disabled/incapable forwarders can perform Interest and Data packet operations using normal ICN techniques.

Accordingly, communication system 100 can provide various features in accordance with various embodiments described herein including, but not limited to: providing for the ability to facilitate in-band BIER signaling in ICN messages; providing that any BIER enabled ICN forwarder that has content stored thereat can perform BIER ingress forwarding operations; providing that any BIER enabled forwarder having a content store can receive content over a BIER tree and can store it, thereby providing for the ability to serve a next ICN Interest without needing to use BIER; providing that ICN forwarders can use BIER forwarding without needing to keep state in a PIT as and/or when desired; providing for the ability to realize shortest path forwarding (as is inherent in BIER) up to the forwarder that has a content store; providing for the ability to combine ICN and BIER forwarding to formulate an optimal content delivery framework; and/or providing for BIER forwarding and/or replication for ICN packets up to the ICN forwarder at the boundary of a BIER domain.

In some embodiments, BIER enabled ICN forwarders may send Data packets to destinations using BIER techniques based on BIFT lookups. For example, consider, at a later time, that F8 sends (224) an Interest packet to F3 including a BIER TLV in which the BIER BitString includes the BFR-IF for F8 (10000000) and a name-prefix identifying the same content that is stored at F3. F3 can receive the Interest and perform operations (225) in which F3 determines based on a lookup in its content store using the name-prefix that it has the content stored. Based on the determination, F3 can generate a Data packet and perform a lookup on its BIFT using the BitString contained in the received Interest packet to determine that F8 is a next-hop neighbor of F3 and the destination BIER enabled ICN forwarder for the Data packet (e.g., F8 sent the Interest for the content). Based on a determination that F8 is a next-hop neighbor of F3 and the destination BIER enabled ICN forwarder for the content, F3 may not encapsulate the Data packet with a BIER header prior to forwarding the Data packet to F8.

Thus, as shown in the embodiment of FIG. 2, BIER enabled ICN forwarders within BIER enabled ICN network 110 can utilize both BIER forwarding techniques and ICN forwarding techniques to satisfy Interests in accordance with various embodiments of communication system 100.

Figure 3:
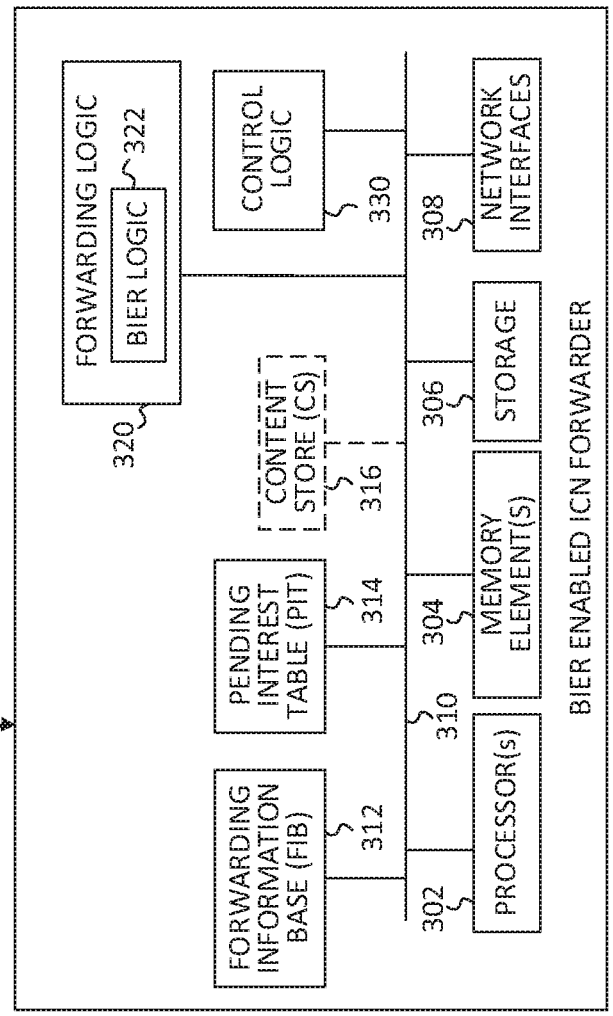
FIG. 3 is a simplified block diagram illustrating example details that can be associated with an example BIER enabled ICN forwarder that can be configured to operate in the communication system in accordance with at least one embodiment.

Referring to FIG. 3, FIG. 3 is a simplified block diagram illustrating example details that can be associated with an example BIER enabled ICN forwarder 300 that can be configured to operate in communication system 100 in accordance with at least one embodiment. Example BIER enabled ICN forwarder 300 can be representative of one or more of BIER enabled ICN forwarders F1-F8 104.1-104.8 or any other BIER enabled ICN forwarders that may be deployed in BIER enabled ICN network 110 to facilitate BIER and ICN packet forwarding in accordance with various embodiments of communication system 100 as described herein. BIER enabled ICN forwarder 300 is a network element that includes Interest and Data packet forwarding capabilities in addition to capabilities to implement BIER enabled ICN embodiments as described herein. BIER enabled ICN forwarder 300 can be implemented using NDN, CCN or any other suitable ICN protocols.

In at least one embodiment, BIER enabled ICN forwarder 300 can include can include one or more processor(s) 302, one or more memory element(s) 304, storage 306, network interfaces 308, a bus 310, forwarding logic 320, and control logic 330. Forwarding logic 320 can be provisioned with BIER logic 322. BIER enabled ICN forwarder 300 can be provisioned to maintain various data structures including a Forwarding Information Base (FIB) 312 and a Pending Interest Table (PIT) 314. In some embodiments, BIER enabled ICN forwarder 300 can be provisioned to maintain another data structure, a content store (CS) 316.

In at least one embodiment, processor(s) 302 is/are at least one hardware processor configured to execute various tasks, operations and/or functions for BIER enabled ICN forwarder 300 as described herein according to software and/or instructions configured for the forwarder. In at least one embodiment, memory element(s) 304 and/or storage 306 is/are configured to store data, information, software, instructions and/or logic associated with BIER enabled ICN forwarder 300 (e.g., data structures, logic, etc. can, in various embodiments, be stored using any combination of memory element(s) 304 and/or storage 306).

In various embodiments, network interfaces 308 can enable communication between BIER enabled ICN forwarder 300 and other forwarders, nodes, etc. that may be present in communication system 100 to facilitate operations as discussed for various embodiments described herein. In various embodiments, network interfaces 308 can be provisioned to support one or more communication protocols, routing protocols, etc., one or more Ethernet driver(s) and/or controller(s), Fibre Channel driver(s) and/or controller(s) or other similar protocols, network interface driver(s) and/or controller(s) to enable communications for BIER enabled ICN forwarder 300 within communication system 100.

In at least one embodiment, bus 310 can be configured as an interface that enables one or more elements of BIER enabled ICN forwarder 300 (e.g., processor(s) 302, memory element(s) 304, logic, etc.) to communicate in order to exchange information and/or data. In at least one embodiment, bus 310 may be implemented as a fast kernel-hosted interconnect, potentially using shared memory between processes (e.g., logic, etc.), which can enable efficient communication paths between the processes.

Regarding various data structures maintained by BIER enabled ICN forwarder 300, Forwarding Information Base (FIB) 312 is populated with a name-prefix based routing protocol, which can be manually or automatically configured in various embodiments. In various embodiments, the name-prefix based routing protocol can be configured as a number of entries that identify a plurality of name-prefixes and forwarding information (e.g., next-hop, interface, etc.) associated with forwarding Interest packets according to each name-prefix. In various embodiments, the name-prefix based routing protocol entries can be manually configured by a network operator or service provider or can be automatically configured. PIT 314 is provisioned to store entries for Interest packets that BIER enabled ICN forwarder 300 has forwarded by not yet satisfied (e.g., Data packets associated with the Interest packets have not yet been received). Each entry in PIT 314 can include the name of content requested in an Interest packet and, in some embodiments, input and output interfaces, next hop information, etc. for packets associated with the content.

Content store (CS) 316, if provisioned for BIER enabled ICN forwarder 300, may be used to store a temporary cache of Data packets received from, for example, a producer node or another upstream BIER enabled ICN forwarder. In some embodiments, Data packets can be cached to satisfy future Interests for the content.

In at least one embodiment, forwarding logic 320 provisioned with BIER logic 322 can include instructions that, when executed (e.g., by processor(s) 302), causes BIER enabled ICN forwarder 300 to perform operations, which can include, but not be limited to: receiving packets; forwarding packets using BIER and/or ICN forwarding techniques; analyzing BIER headers; analyzing BIER TLVs; appending a BFR-ID for the forwarder to BIER TLVs of Interest packets; resetting bits of BIER headers for Data packets; including BIER TLVs in Interest packets; performing encapsulation of BIER headers for Data packets; performing decapsulation of BIER headers from Data packets; performing packet replication operations; interacting with data structures; combinations thereof; and/or any other operations as discussed for various embodiments described herein.

In at least one embodiment, control logic 330 can include instructions that, when executed, cause BIER enabled ICN forwarder 300 to perform operations, which can include, but not be limited to, providing overall control operations of BIER enabled ICN forwarder 300; cooperating with other logic provisioned for BIER enabled ICN forwarder 300; interacting with data structures; combinations thereof; or the like to facilitate various operations as discussed for various embodiments described herein.

Figure 4B:
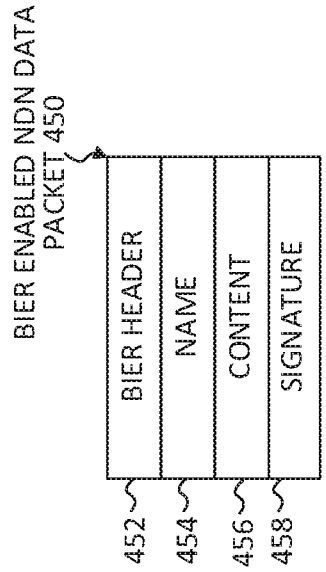
FIGS. 4A-4B are simplified schematic diagrams illustrating example details that can be associated Interest and Data packets for BIER enabled Named Data Networking (NDN)-based implementations in accordance with at least one embodiment of the communication system.
Figure 4A:
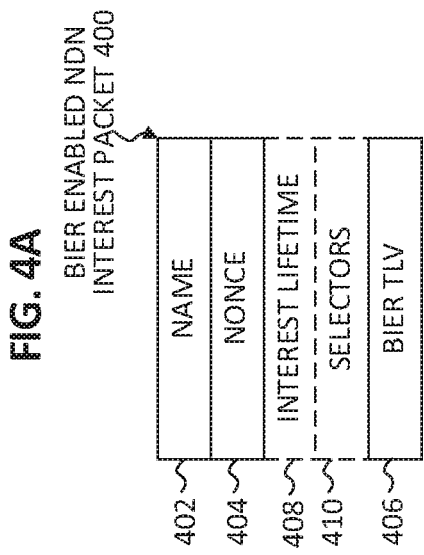

Referring to FIG. 4A, FIG. 4A is a simplified schematic diagram illustrating example details that can be associated with an example BIER enabled NDN Interest packet 400 that can support BIER enabled forwarding for an NDN-based implementation of BIER enabled ICN network 110 in accordance with at least one embodiment of communication system 100. BIER enabled NDN Interest packet 400 can include a name field 402, a nonce field 404 and a BIER TLV 406. In some embodiments, the BIER enabled NDN Interest packet can further include an interest lifetime field 408 and a selectors field 410.

The name field 402 can include the name-prefix for requested content and nonce field 404 can include a nonce that can be used along with the name-prefix to uniquely identify the packet. The BIER TLV 406 can include a BIER BitString in which a number of bits can be set (e.g., set to a logical 1) or reset (e.g., set to a logical 0) based on various operations as discussed for various embodiments described herein. The length of the BIER TLV 406 and corresponding BIER BitString contained in the header can vary depending on the number of BIER enabled ICN forwarders provisioned for a given deployment.

In one embodiment, a BIER TLV can be encoded in a TLV format to include a TLV-TYPE field, a TLV-LENGTH field and an TLV-VALUE field as follows:
  TLV:=TLV-TYPE TLV-LENGTH TLV-VALUE
  TLV-VALUE:=BIER BitString The TLV-TYPE field can be set to a value that identifies the TLV as a BIER type TLV, the TLV-LENGTH field can be set to a length value that identifies the length of the data carried in the Value field and the TLV-VALUE field can include a BIER BitString.

In some embodiments, selectors field 410 may be included in BIER enabled NDN Interest packet 400 to facilitate implementations using a continuous memory block of name field 402 and a number of selectors included in selector field 410 together as an index for a PIT lookup. In still some embodiments, interest lifetime field 408 may be included, which can affect forwarding behavior, such as how long an Interest packet may be kept in the PIT.

In at least one embodiment, BIER enabled NDN Interest packet 400 can be encoded in a Type-Length-Value (TLV) element or format. As noted previously, a TLV element or format includes a Type field, a Length field and a Value field. In one embodiment, the Type field can identify a type of data that is carried in the Value field, Length field can identify the length of the data carried in the Value field or of the packet, and the Value field can contain the data that is to be processed. In another embodiment, the Length field may contain the length of the TLV (e.g., the packet). In one example, BIER enabled NDN Interest packet 400 can be encoded in a TLV format to include an INTEREST-TYPE field, a TLV-LENGTH field and an INTEREST-VALUE field as follows:
  INTEREST:=INTEREST-TYPE TLV-LENGTH INTEREST-VALUE
  INTEREST-VALUE:=Name
    Nonce The INTEREST-TYPE field can be set to a value that identifies the packet as an Interest type packet, the TLV-LENGTH field can be set to a length value as discussed above and the INTEREST-VALUE field can include the name field, the nonce field and, in some embodiments, the selectors field and/or interest lifetime field.

Referring to FIG. 4B, FIG. 4B is a simplified schematic diagram illustrating example details that can be associated with an example BIER enabled NDN Data packet 450 that can support BIER enabled forwarding for an NDN-based implementation of BIER enabled ICN network 110 in accordance with at least one embodiment of communication system 100. BIER enabled NDN Data packet 450 can include a BIER header 452, name field 454, a content field 456, and a signature field 456.

The BIER header 452 can include, among other information as may be defined by the IETF, a BIER BitString in which a number of bits can be set or reset based on various operations as discussed for various embodiments described herein. Name field 454 can identify the content being transmitted by the packet, content field 456 can contain the content being transmitted, and signature field 458 can include a signature by a publisher of the content to digitally sign the published content.

In at least one embodiment, BIER enabled NDN Data packet 450 can be defined using type-length-value (TLV) element or format as previously described generally, and more specifically to include a CONTENT TYPE field, a TLV-LENGTH field and a CONTENT-VALUE field as follows:

CONTENT:=CONTENT-TYPE TLV-LENGTH CONTENT-VALUE
CONTENT-VALUE:=Name
  Content
  Signature The CONTENT-TYPE field can be set to a value that identifies the packet as a Content type packet, the TLV-LENGTH field can be set to a length value as discussed above and the CONTENT-VALUE field can include the name field, the content field and the signature field. It should be noted that BIER enabled NDN Interest and Data packets could contain additional elements and fields not represented in FIGS. 4A and 4B depending on particular needs and implementations.

Figure 5B:
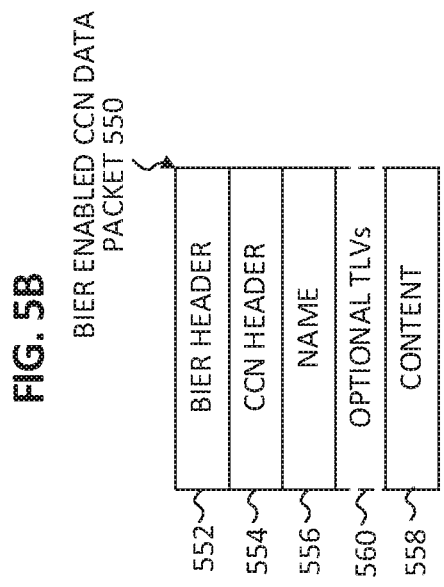
FIGS. 5A-5B are simplified schematic diagrams illustrating example details that can be associated Interest and Data packets for BIER enabled Content-Centric Networking (CCN)-based implementations in accordance with at least one embodiment of the communication system.
Figure 5A:
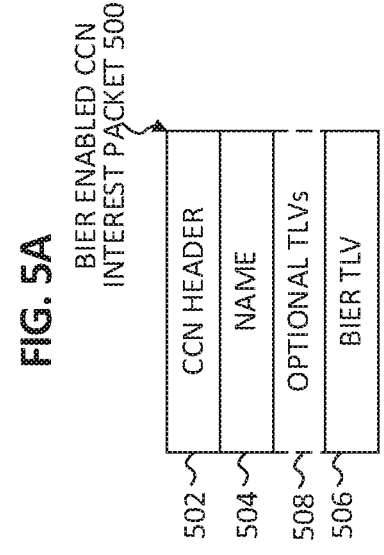

Referring to FIG. 5A, FIG. 5A is a simplified schematic diagram illustrating example details that can be associated with an example BIER enabled CCN Interest packet 500 that can support BIER enabled forwarding for a CCN-based implementation of BIER enabled ICN network 110 in accordance with at least one embodiment of communication system 100. BIER enabled CCN Interest packet 500 can include a CCN header 502, a name field 504 and a BIER TLV 506. In some embodiments, the BIER enabled CCN Interest packet can further include optional TLVs 508.

CCN header 502 can include information such as, for example, version information, packet length information, hop limit information, flags, message type information or other information as may be defined by the IETF. Name field 504 can include the name-prefix for requested content. Optional TLVs 508 can be used to include other information such as, for example, a validation algorithm, a validation payload, metadata elements, combinations thereof, or the like.

The BIER TLV 506 can include a BIER BitString in which a number of bits can be set (e.g., set to a logical 1) or reset (e.g., set to a logical 0) based on various operations as discussed for various embodiments described herein. The length of the BIER TLV 506 and corresponding BIER BitString contained in the header can vary depending on the number of BIER enabled ICN forwarders provisioned for a given deployment.

In one embodiment, a BIER TLV can be encoded in a TLV format to include a TLV-TYPE field, a TLV-LENGTH field and an TLV-VALUE field as follows:

TLV:=TLV-TYPE TLV-LENGTH TLV-VALUE
TLV-VALUE:=BIER BitString

The TLV-TYPE field can be set to a value that identifies the TLV as a BIER type TLV, the TLV-LENGTH field can be set to a length value that identifies the length of the data carried in the Value field and the TLV-VALUE field can include a BIER BitString.

Referring to FIG. 5B, FIG. 5B is a simplified schematic diagram illustrating example details that can be associated with an example BIER enabled CCN Data packet 550 that can support BIER enabled forwarding for a CCN-based implementation of BIER enabled ICN network 110 in accordance with at least one embodiment of communication system 100. BIER enabled CCN Data packet 550 can include a BIER header 552, a CCN header 554, a name field 556, and a content field 558. In some embodiments, the BIER enabled CCN Interest packet can further include optional TLVs 560.

The BIER header 552 can include, among other information as may be defined by the IETF, a BIER BitString in which a number of bits can be set or reset based on various operations as discussed for various embodiments described herein. CCN header 554 can include information such as, for example, version information, packet length information, hop limit information, flags, message type information or other information as may be defined by the IETF. Name field 556 can identify the content being transmitted by the packet and content field 558 can contain the content being transmitted. Optional TLVs 560 can be used to include other information such as, for example, a validation algorithm, a validation payload, metadata elements, combinations thereof, or the like. It should be noted that BIER enabled CCN Interest and Data packets could contain additional elements and fields not represented in FIGS. 5A and 5B depending on particular needs and implementations.

Referring to FIG. 6, FIG. 6 is a simplified flow diagram illustrating example operations 600 that can be associated with BIER enabled packet forwarding in accordance with at least one embodiment of communication system 100. In various embodiments, operations 600 can be performed by BIER enabled ICN forwarder 300, any of BIER enabled ICN forwarders F1-F8 104.1-104.8 or any other ICN forwarder that may be deployed for communication system 100.

At any time, a given BIER enabled ICN forwarder can receive (602) a packet. The packet can either be an Interest packet or a Data packet. At 604, the BIER enabled ICN forwarder determines BIER information associated with the packet. In some embodiments, the determining at 604 can include determining whether one or more bits are set for a BIER BitString included in a BIER header for the packet (e.g., for Data packet forwarding, PIT update operations, replication operations, and/or other operations as discussed for various embodiments described herein). In some embodiments, the determining at 604 can include determining whether the packet includes a BIER TLV (e.g., for Interest packets received from a consumer having no BIER TLV).

At 606, the BIER enabled ICN forwarder can forward the packet based, at least in part, on the BIER information associated with the packet and the operations can return to 602 for the forwarder to receive another packet and repeat the operations as discussed for the embodiment of FIG. 6. In some embodiments, the forwarding at 606 can include forwarding an Interest packet toward an upstream BIER enabled ICN forwarder or producer node, potentially including a BIER TLV in the Interest prior to the forwarding. In some embodiments, the forwarding at 606 can include forwarding a Data packet toward a downstream BIER enabled ICN forwarder or consumer node, potentially performing BIER header encapsulation or decapsulation for the packet prior to the forwarding.

Figure 7:
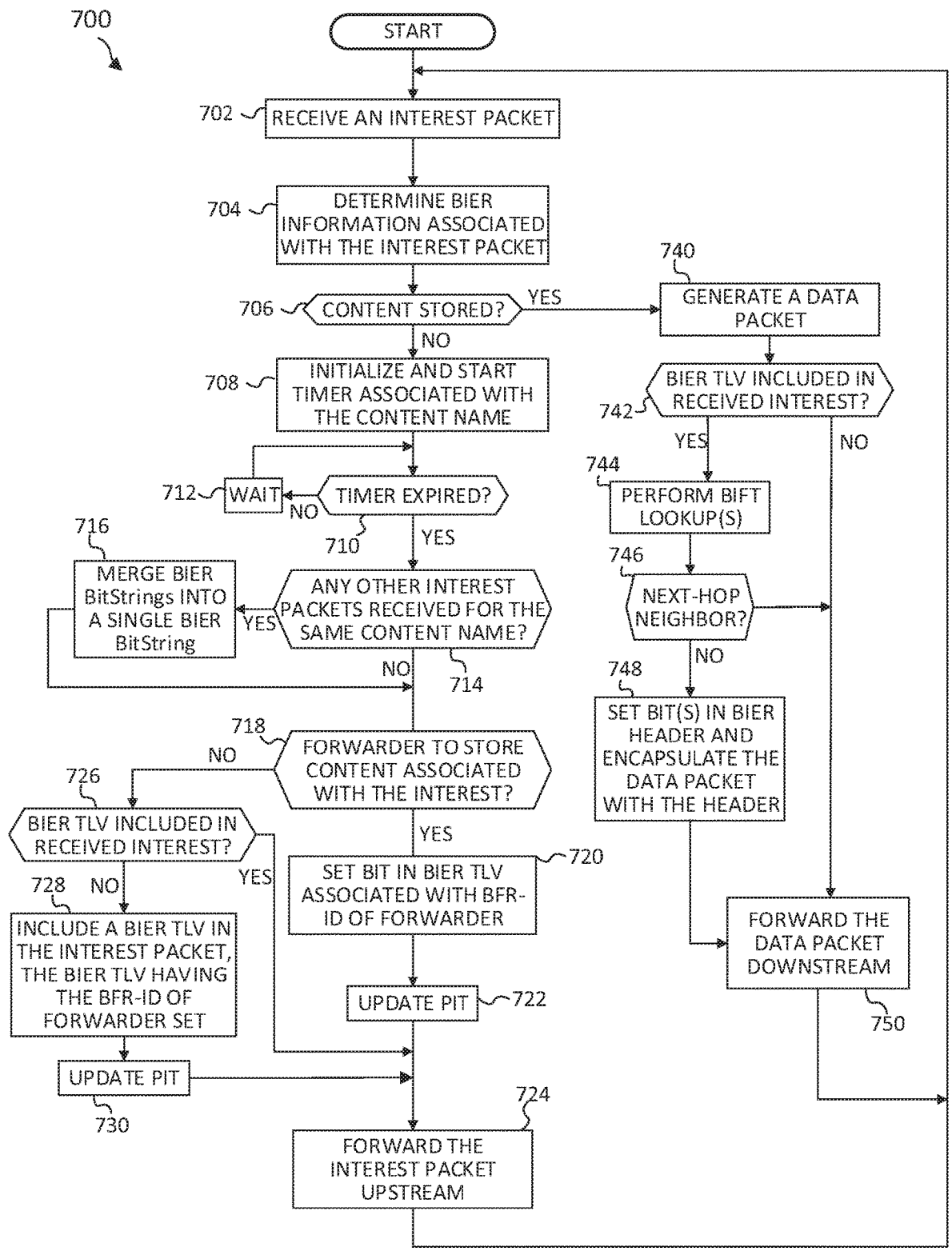
FIG. 7 is a simplified flow diagram illustrating example operations that can be associated with Interest packet forwarding for a BIER enabled ICN forwarder in accordance with at least one embodiment of the communication system.

Referring to FIG. 7, FIG. 7 is a simplified flow diagram illustrating example operations 700 that can be associated with Interest packet forwarding in accordance with at least one embodiment of communication system 100. In various embodiments, operations 700 can be performed by BIER enabled ICN forwarder 300, any of BIER enabled ICN forwarders F1-F8 104.1-104.8 or any other ICN forwarder that may be deployed for communication system 100.

At any time, a given BIER enabled ICN forwarder (referred to generally for the embodiment of FIG. 7 as 'forwarder') can receive (702) an Interest packet from a downstream source. At 704, the forwarder determines BIER information associated with the Interest packet. In at embodiment, the determining at 704 can include determining whether the Interest includes a BIER TLV and, if so, determining one or more bit(s) that are set for a BIER BitString of the BIER TLV. At 706, the forwarder determines whether content is stored at the forwarder based on the content name (e.g., the name-prefix) contained in the Interest packet. Based on a determination at 706 that content is stored at the forwarder, the operations continue to 740, which is discussed in further detail below.

Based on a determination at 706 that no content for the Interest is stored at the forwarder, the operations continue to 708 at which the forwarder initializes and starts a timer associated with the content name and the operations can continue to 710. In at least one embodiment, the initializing at 708 can include setting a start time (e.g., 0) and a threshold time for which the forwarder can wait to receive interests for a same content. In various embodiments, a threshold time can be set to less than one second up to several minutes based on needs and implementations.

At 710 and 712, the forwarder determines whether the timer has expired (e.g., reached the threshold time) and waits until the timer has expired. Based on a determination that the timer has expired, the operations continue to 714 at which the forwarder determines whether any other Interest(s) have been received for the same content. Based on a determination at 714 that other Interests have been received for the same content, the operations continue to 716 at which the forwarder merges any BIER BitString(s) for any BIER TLV(s) for each received Interest for the same content to generate a single BIER BitString for the BIER TLV and the operations continue to 718. In at least one embodiment, the merging at 716 can include performing a bitwise logical OR operation on each BIER BitString for each BIER TLV for each received Interest to generate a single BIER BitString. Based on a determination at 714 that no other interests have been received, the operations continue to 718.

At 718, the forwarder determines whether the forwarder is to store content associated with the Interest (e.g., based on policy, based on whether a content store is configured for the forwarder, or based on whether a content store configured for the forwarder is full). Based on a determination at 718 that the forwarder is not to store content associated with the Interest, the forwarder does not update its PIT and the operations continue to 726 at which the forwarder determines whether a BIER TLV was included in the received Interest packet or packet(s). Based on a determination at 726 that no BIER TLV was included in the received Interest packet(s), the forwarder includes (728) a BIER TLV in the Interest packet, the BIER TLV having the BFR-ID of the forwarder set in the BIER BitString for the BIER TLV, update its PIT (730) and the operations continue to 724 at which the forwarder forwards the packet upstream (e.g., using a FIB lookup) and the operations return to 702 for the forwarder to receive a subsequent Interest packet and repeat the operations as discussed for the embodiment of FIG. 7. Based on a determination at 726 that there was a BIER TLV in the received Interest packet(s), the operations continue to 724 without the forwarder updating its PIT. At 724, the forwarder forwards the Interest packet upstream (e.g., using a FIB lookup) and the operations return to 702 for the forwarder to receive a subsequent Interest packet and repeat the operations as discussed for the embodiment of FIG. 7.

Based on a determination at 718 that the forwarder is to store content associated with the Interest, the operations continue to 720. At 720, the forwarder sets a bit in the BIER BitString of the BIER TLV that is associated with the BFR-ID of the forwarder (e.g., it sets the bit position in the BitString for the BIER TLV that corresponds to the BFR-ID of the forwarder to a value of 1) and the operations continue to 722. At 722, the forwarder updates its PIT and the operations continue to 724 at which the forwarder forwards the packet upstream (e.g., using a FIB lookup) and the operations return to 702 for the forwarder to receive a subsequent Interest packet and repeat the operations as discussed for the embodiment of FIG. 7.

As noted above, based on a determination at 706 that content is stored at the forwarder, the operations continue to 740 at which the forwarder generates a Data packet that includes the content and the operations continue to 742. At 742, the forwarder determines whether a BIER TLV was included in the received Interest packet. Based on a determination at 742 that there is no BIER TLV included received Interest packet, the operations continue to 750 at which the forwarder forwards the generated Data packet downstream and the operations return to 702 for the forwarder to receive a subsequent Interest packet and repeat the operations as discussed for the embodiment of FIG. 7.

Based on a determination at 742 that there is a BIER TLV included with the received Interest, the operations continue to 744 at which the forwarder performs one or more BIFT lookup(s) to determine one or more destination BIER enabled ICN forwarder(s) that are to receive the content and the operations continue to 746. At 746, the forwarder determines, based on the BIFT lookup(s) whether the Data packet is to be forwarded only to a destination BIER enabled ICN forwarder that is also a next-hop neighbor. Based on a determination at 746 that the Data packet is to be forwarded only to a destination BIER enabled ICN forwarder that is also a next-hop neighbor, the operations continue to 740 at which the forwarder forwards the generated Data packet to the next-hop neighbor and the operations return to 702 for the forwarder to receive a subsequent Interest packet and repeat the operations as discussed for the embodiment of FIG. 7.

Based on a determination at 746 that the Data packet is not to be forwarded only to a destination BIER enabled ICN forwarder that is also a next-hop neighbor, the operations continue to 748 at which the forwarder sets one or more bit(s) in a BIER BitString based on the BIFT lookup(s), encapsulates the Data packet with a BIER header including the BIER BitString, and the operations continue to 750 at which the forwarder forwards the Data packet back downstream and the operations return to 702 for the forwarder to receive a subsequent Interest packet and repeat the operations as discussed for the embodiment of FIG. 7.

In various embodiments, the forwarding operations at 750 can be performed using BIER forwarding techniques or using ICN forwarding techniques. For example, based on a determination at 742 that no BIER TLV was included in the received Interest, the forwarder could determine that the Data packet is to be delivered to a given consumer node and the forwarding at 750 could be performed using ICN forwarding techniques. In another example, based on a determination at 742 there is a BIER TLV included in the received Interest, the forwarder could determine that the Data packet is to be delivered to at least one BIER enabled ICN forwarder and the forwarding at 750 could be performed using BIER forwarding techniques. In still another example, based on a determination at 746 that a Data packet is to be forwarded only to a next hop neighbor from whom the Interest was received, the forwarding at 750 could be performed using ICN forwarding techniques.

Figure 8:
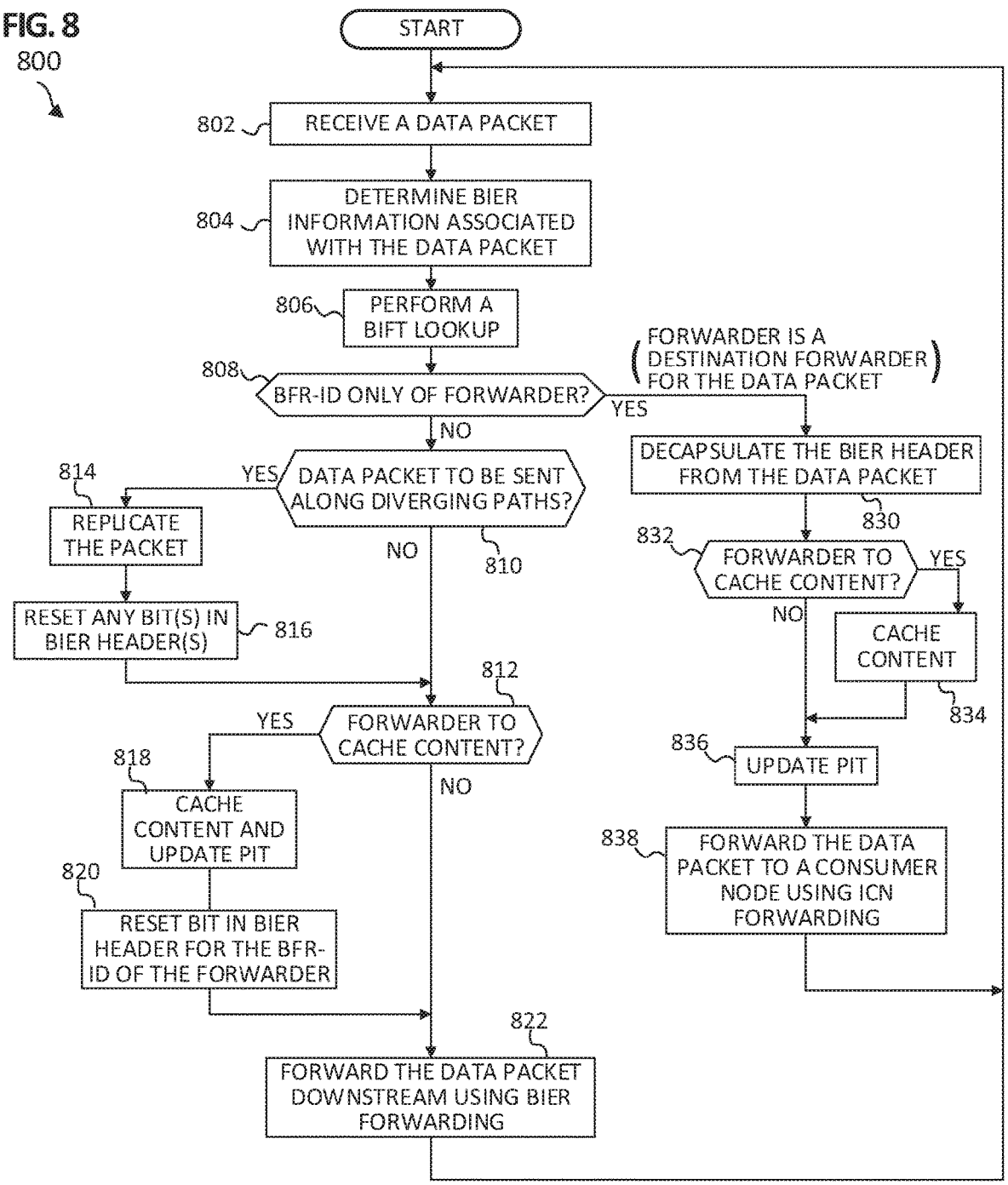
FIG. 8 is a simplified flow diagram illustrating example operations that can be associated with Data packet forwarding for a BIER enabled ICN forwarder in accordance with at least one embodiment of the communication system.

Referring to FIG. 8, FIG. 8 is a simplified flow diagram illustrating example operations 800 that can be associated with Data packet forwarding in accordance with at least one embodiment of communication system 100. In various embodiments, operations 700 can be performed by BIER enabled ICN forwarder 300, any of BIER enabled ICN forwarders F1-F8 104.1-104.8 or any other ICN forwarder that may be deployed for communication system 100.

At any time, a given BIER enabled ICN forwarder (referred to generally for the embodiment of FIG. 8 as 'forwarder') can receive (802) a Data packet from an upstream source. At 804, the forwarder determines BIER information associated with the Data packet and the operations continue to 806. In at least one embodiment, the determining at 804 can include determining one or more bit(s) set for a BIER header included in a received Data packet.

At 806, the forwarder performs a BIFT lookup on its BIFT using one or more bit(s) set in the BIER header. At 808, the forwarder determines based on the BIFT lookup whether the BIER header only includes a bit set that corresponds to the BFR-ID of the forwarder. Based on a determination at 808 that the BIER header only includes a bit set that corresponds to the BFR-ID of the forwarder, the operations continue to 830 as discussed in further detail below.

Based on a determination at 808 that the BIER header includes other bit(s) set that correspond to other forwarders, the operations continue to 810. At 810, the forwarder determines, based on the BIFT lookup, whether the Data packet is to be forwarded along diverging paths to in order to be delivered to multiple destination forwarders.

Based on a determination at 810 that the Data packet is not to be forwarded along diverging paths, the operations continue to 812. However, based on a determination at 810 that the Data packet is to be sent along diverging paths, the operations continue to 814 at which the forwarder replicates the packet to generate a number of replicated Data packets and the operations continue to 816. The number of replicated Data packets is equal to the number of diverging paths. At 816, the forwarder resets any bit(s) in the BIER header of each replicated Data packet based on the destination forwarder that each replicated Data packet is to be forwarded towards and the operations continue to 812.

At 812, the forwarder determines whether it is to cache content for the received Data packet. The determining at 812 can include the forwarder performing a lookup on its PIT to determine whether it is to cache the content. Based on a determination at 812 that the forwarder is to cache content for the received Data packet, the operations continue to 818 at which the forwarder caches the content in its content store and updates its PIT and the operations can continue to 820. At 820, the forwarder resets a bit in the BIER header that corresponds to the BFR-ID of the forwarder itself and the operations continue to 822.

Based on a determination at 818 that the forwarder is not to cache content for the received Data packet, the operations can continue to 822. At 822, the forwarder forwards the Data packet downstream using BIER forwarding and the operations return to 802 for the forwarder to receive a subsequent Data packet and repeat the operations as discussed for the embodiment of FIG. 8.

Recalling the operations at 808, based on a determination that the BIER header only includes a bit set that corresponds to the BFR-ID of the forwarder, the operations continue to 830. At 830, the forwarder decapsulates the BIER header from the Data packet and the operations continue to 832. At 832, the forwarder determines whether it is to cache content for the received Data packet. Based on a determination at 832 that the forwarder is to cache content for the received Data packet, the operations continue to 834 at which the forwarder caches the content in its content store and the operations continue to 836. Based on a determination at 832 that the forwarder is not to cache content for the received Data packet, the operations can continue to 836. At 836, the forwarder updates its PIT and the operations continue to 838. At 838, the forwarder forwards the Data packet downstream to a given consumer that requested the content or to a BIER disabled/incapable ICN forwarder using ICN forwarding and the operations return to 802 for the forwarder to receive a subsequent Data packet and repeat the operations as discussed for the embodiment of FIG. 8.

Figure 9:
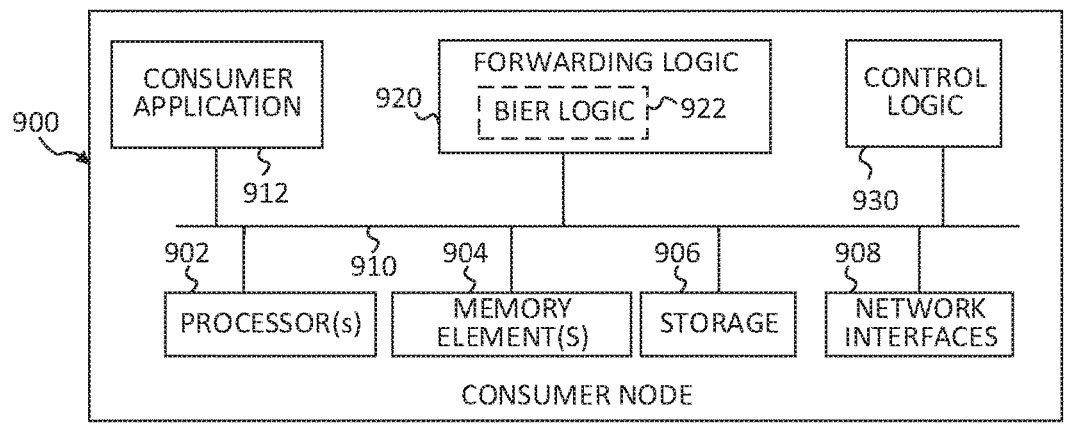
FIGS. 9-10 are simplified block diagrams illustrating other example details that can be associated with the communication system in accordance with various embodiments.

Referring to FIG. 9, FIG. 9 is a simplified block diagram illustrating example details that can be associated with an example consumer node 900 that can be configured to operate in communication system 100 in accordance with at least one embodiment. Example consumer node 900 can be representative of consumer nodes 102.1-102.2 or any other consumer node that may be deployed in communication system 100 to facilitate BIER and ICN operations in accordance with various embodiments of communication system 100 as described herein. Consumer node 900 is a network element that includes ICN Interest and Data packet operations in addition to capabilities to implement operations as described herein. Consumer node 900 can be implemented using NDN, CCN or any other suitable ICN protocols.

In at least one embodiment, consumer node 900 can include can include one or more processor(s) 902, one or more memory element(s) 904, storage 906, network interfaces 908, a bus 910, consumer applications 912, forwarding logic 920 and control logic 930. In at least one embodiment, forwarding logic 920 can be provisioned with BIER logic 922 to enable BIER capabilities for consumer node. In some embodiments, consumer node 900 can be provisioned to maintain various data structures.

In at least one embodiment, processor(s) 902 is/are at least one hardware processor configured to execute various tasks, operations and/or functions for consumer node 900 as described herein according to software and/or instructions configured for the producer node. In at least one embodiment, memory element(s) 904 and/or storage 906 is/are configured to store data, information, software, instructions and/or logic associated with consumer node 900 (e.g., data structures, logic, etc. can, in various embodiments, be stored using any combination of memory element(s) 904 and/or storage 906).

In various embodiments, network interfaces 908 enable communication between consumer node 900 and forwarders, nodes, etc. that may be present in communication system 100 to facilitate operations as discussed for various embodiments described herein. In various embodiments, network interfaces 908 can be provisioned to support one or more communication protocols, routing protocols, etc., one or more Ethernet driver(s) and/or controller(s), Fibre Channel driver(s) and/or controller(s) or other similar protocols, network interface driver(s) and/or controller(s) to enable communications for consumer node 900 within communication system 100.

In at least one embodiment, bus 910 can be configured as an interface that enables one or more elements of consumer node 900 (e.g., processor(s) 902, memory element(s) 904, logic, etc.) to communicate in order to exchange information and/or data. In at least one embodiment, bus 910 may be implemented as a fast kernel-hosted interconnect, potentially using shared memory between processes (e.g., logic, etc.), which can enable efficient communication paths between the processes.

In various embodiments, producer applications, such as consumer application 912, configured for consumer node 900 can be provisioned to send generate and request content via BIER enabled ICN network 110 by generating and injecting one or more Interest packets into the network. Upon determining a need to request content, the consumer node 900 can generate one or more Interest packets and injecting the Interest packets into the BIER enabled ICN network 110. In various embodiments, Interest packets can be injected into an ICN network without BIER TLVs or can be injected with BIER TLVs having no BFR-IDs set in a BIER BitString of BIER TLVs. Recall, a consumer node can be a producer node in some cases and vice-versa. Thus, in at least one embodiment, consumer node 900 can also perform operations as a producer node in order to inject Data packets into the BIER enabled ICN network 110 for content requested by another consumer node that may be present in communication system 100.

In at least one embodiment, forwarding logic 920 can include instructions that, when executed (e.g., by processor(s) 902), causes consumer node 900 to perform operations, which can include, but not be limited to: receiving Interest packets; generating Interest and/or Data packets; forwarding Data and/or Interest packets and/or ICN forwarding techniques as discussed herein; interacting with data structures; combinations thereof; and/or any other operations as discussed for various embodiments described herein. In at least one embodiment, BIER logic 922 can be configured for forwarding logic 920 such that the BIER logic can include instructions that, when executed, causes consumer node 900 to perform BIER operations including, but not limited to: analyzing and/or generating BIER headers; analyzing and/or generating BIER TLVs; injecting Interest packets into a BIER enabled ICN network with or without BIER TLVs; injecting Data packets including BIER headers into a BIER enabled ICN network; combinations thereof; and/or any other operations as discussed for various embodiments described herein.

In at least one embodiment, control logic 930 can include instructions that, when executed, cause consumer node 900 to perform operations, which can include, but not be limited to, providing overall control operations of consumer node 900; cooperating with other logic provisioned for consumer node 900; interacting with data structures; combinations thereof; or the like to facilitate various operations as discussed for various embodiments described herein.

Figure 10:
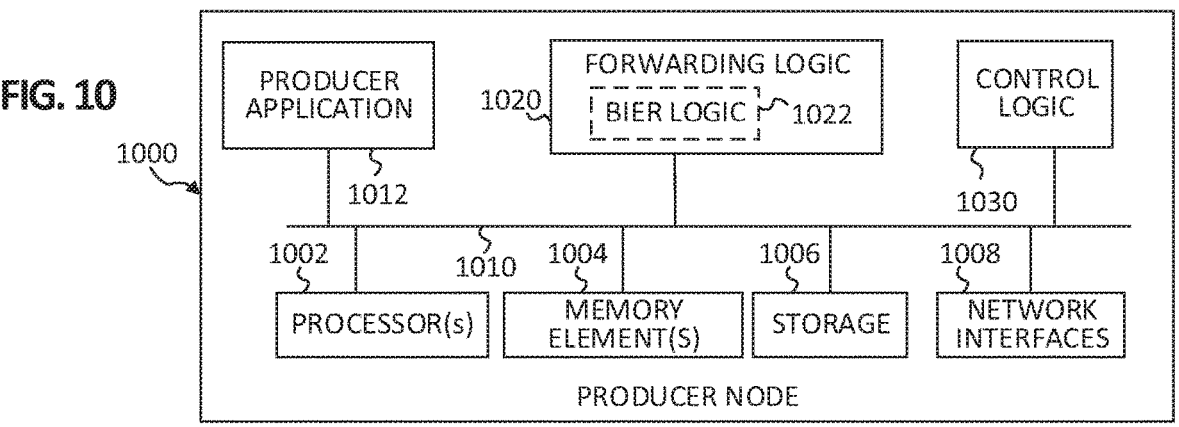

Referring to FIG. 10, FIG. 10 is a simplified block diagram illustrating example details that can be associated with an example producer node 1000 that can be configured to operate in communication system 100 in accordance with at least one embodiment. Example producer node 1000 can be representative of producer node 106 or any other producer node that may be deployed in communication system 100 to facilitate BIER and ICN operations in accordance with various embodiments of communication system 100 as described herein. Producer node 1000 is a network element that includes ICN Interest and Data packet operations in addition to capabilities to implement operations as described herein. Producer node 1000 can be implemented using NDN, CCN or any other suitable ICN protocols.

In at least one embodiment, producer node 1000 can include can include one or more processor(s) 1002, one or more memory element(s) 1004, storage 1006, network interfaces 1008, a bus 1010, producer applications 1012, forwarding logic 1020, and control logic 1030. In at least one embodiment, forwarding logic 1020 can be provisioned with BIER logic 1022. In some embodiments, producer node 1000 can be provisioned to maintain various data structures.

In at least one embodiment, processor(s) 1002 is/are at least one hardware processor configured to execute various tasks, operations and/or functions for producer node 1000 as described herein according to software and/or instructions configured for the producer node. In at least one embodiment, memory element(s) 1004 and/or storage 1006 is/are configured to store data, information, software, instructions and/or logic associated with producer node 1000 (e.g., data structures, logic, etc. can, in various embodiments, be stored using any combination of memory element(s) 1004 and/or storage 1006).

In various embodiments, network interfaces 1008 enable communication between producer node 1000 and forwarders, nodes, etc. that may be present in communication system 100 to facilitate operations as discussed for various embodiments described herein. In various embodiments, network interfaces 1008 can be provisioned to support one or more communication protocols, routing protocols, etc., one or more Ethernet driver(s) and/or controller(s), Fibre Channel driver(s) and/or controller(s) or other similar protocols, network interface driver(s) and/or controller(s) to enable communications for producer node 1000 within communication system 100.

In at least one embodiment, bus 1010 can be configured as an interface that enables one or more elements of producer node 1000 (e.g., processor(s) 1002, memory element(s) 1004, logic, etc.) to communicate in order to exchange information and/or data. In at least one embodiment, bus 1010 may be implemented as a fast kernel-hosted interconnect, potentially using shared memory between processes (e.g., logic, etc.), which can enable efficient communication paths between the processes.

In various embodiments, producer applications, such as producer application 1014, configured for producer node 1000 can be provisioned to send content to the BIER enabled ICN network 110 via one or more Data packets in response to one or more Interest packets. Upon determining a need to send content to the BIER enabled ICN network 110, the producer node 1000 can implement operations as discussed herein (e.g., similar to operations 702, 704, 706, 740, 742, 744, 746, 748, and/or 750 as discussed for the embodiment of FIG. 7) to inject Data packets into the BIER enabled ICN network 110. Recall, a producer node can be a consumer node in some cases and vice-versa. Thus, in at least one embodiment, producer node 1000 can also perform operations as a consumer node in order to inject Interest packets into the BIER enabled ICN network 110 for content desired by the producer node 1000. In various embodiments, Interest packets can be injected without BIER TLVs or can be injected with BIER TLVs containing a BIER BitString having no BFR-IDs set.

In at least one embodiment, forwarding logic 1020 can include instructions that, when executed (e.g., by processor(s) 1002), causes producer node 1000 to perform operations, which can include, but not be limited to: receiving Interest packets; generating Interest and/or Data packets using ICN forwarding techniques as discussed herein; interacting with data structures; combinations thereof; and/or any other operations as discussed for various embodiments described herein. In at least one embodiment, BIER logic 1022 can be configured for forwarding logic 1020 such that the BIER logic 1022 can include instructions that, when executed causes producer node 1000 to perform BIER operations including, but not limited to: forwarding Data and/or Interest packets using BIER techniques; analyzing and/or generating BIER headers; analyzing and/or generating BIER TLVs; injecting Data packets including BIER headers into a BIER enabled ICN network; injecting Interest packets into a BIER enabled ICN network with or without BIER TLVs; combinations thereof; and/or any other operations as discussed for various embodiments described herein.

In at least one embodiment, control logic 1030 can include instructions that, when executed, cause producer node 1000 to perform operations, which can include, but not be limited to, providing overall control operations of producer node 1000; cooperating with other logic provisioned for producer node 1000; interacting with data structures; combinations thereof; or the like to facilitate various operations as discussed for various embodiments described herein.

Variations and Implementations

In regards to the internal structure associated with communication system 100, appropriate software, hardware and/or algorithms are being provisioned for ICN forwarders (e.g., ICN forwarders 104.1-104.8 and 300), consumer nodes (e.g., consumer nodes 102, 900) and producer nodes (e.g., producer node 106, 1000) within communication system 100 in order to facilitate operations as discussed for various embodiments described herein to facilitate BIER enabled ICN packet forwarding in a network environment.

The terms 'node', 'forwarder', 'router' or variations thereof can be inclusive of devices used to initiate and/or respond to communications (e.g., Interest packets, Data packets, etc.) in a network, such as a computer, an electronic device such as an (IoT) device (e.g., an appliance, a thermostat, a sensor, a parking meter, etc.), a personal digital assistant (PDA), a laptop or electronic notebook, a gaming system, a vehicle infotainment system, a smart television, a cellular telephone, an IP phone, an electronic device having cellular and/or Wi-Fi connection capabilities, a wearable electronic device or any other device, component, element, or object capable of initiating voice, audio, video, media, or data exchanges within communication system 100. A node, forwarder or router may also be inclusive of a suitable interface to a human user such as a microphone, a display, a keyboard, or other terminal equipment.

A node, forwarder or router may also be any device that seeks to initiate a communication on behalf of another entity or element such as a program, application, a database, or any other component, device, element, or object capable of initiating an exchange within communication system 100. Within communication system 100, IP addresses, if used, can be assigned using Dynamic Host Configuration Protocol (DHCP), Stateless Address Auto-configuration (SLAAC), ICN protocols or any suitable variation thereof. IP addresses, if used within communication system 100, can include IP version 4 (IPv4) and/or IP version 6 (IPv6) addresses.

In at least some embodiments, consumer nodes and/or producer nodes can be associated with users that communicate in communication system 100 via BIER enabled ICN network 110. In other embodiments, consumer nodes and/or producer nodes may facilitate data exchanges via BIER enabled ICN network 110 while operating independently of user interactions. Although various functions are described herein as relating to either a consumer node or a producer node, it should be apparent that a node could be configured to act as both a consumer node and a producer node. For example, in some embodiments, a producer node can be a consumer in itself and/or a consumer node can be a producer node. In one example, a video conference call established over BIER enabled ICN network 110 could include nodes associated with respective users, which can be configured to act as both producers and consumers of video content produced for the call. Thus, elements of consumer nodes and producer nodes may be provisioned in any suitable arrangement or configuration to achieve the operational features of a consumer node, a producer node, or a suitable combination thereof.

Communication system 100 can include one or more networks, such as BIER enabled ICN network 110, which can represent a series of points or nodes of interconnected communication paths for receiving and transmitting messages (e.g., packets of information) that propagate through the one or more networks. These nodes offer communicative interfaces between nodes (e.g., consumer nodes, producer nodes, and ICN forwarders). A network, such as BIER enabled ICN network 110, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

Networks through which communications propagate in communication system 100 can use any suitable technologies for communication including wireless (e.g., 3G/4G/5G/nG network, Institute of Electrical and Electronics Engineers (IEEE) Std 802.11 ™-2012, published Mar. 29, 2012, WiMAX, IEEE Std 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Communications in a network environment can be referred to herein as 'messages', 'messaging', 'signaling', 'data', 'content', 'Interest' 'objects', 'requests', 'queries', 'responses', 'replies', etc. which may be inclusive of packets. Generally, signaling is referred to in reference to control-plane or management-plane packets while messaging can be referred to in reference to control-plane, management-plane or data-plane packets exchanged for communications at the application level. In an ICN architecture, ICN Interest packets are control-plane packets, while Data packets are data-plane packets.

A packet is a formatted unit of data and can contain both control information (e.g., source and destination address, etc.) and data, which is also known as a payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information', 'content', 'parameters' and variations thereof as used herein can refer to any type of binary, numeric, voice, video, textual, photographic or script data or information or any type of source or object code, or any other suitable data or information in any appropriate format that can be communicated from one point to another using electronic systems (e.g., servers, routers, forwarders, computing devices, compute nodes, client nodes, consumer nodes, producer nodes, etc.) and/or networks.

In various embodiments, communication system 100 may implement User Datagram Protocol/Internet Protocol (UDP/IP) connections and/or Transmission Control Protocol/IP (TCP/IP) connections in particular embodiments of the present disclosure. However, communication system 100 can alternatively implement any other suitable communication protocol, interface and/or standard, proprietary and/or non-proprietary, for transmitting and receiving messaging and/or signaling.

In various example implementations, ICN forwarders, consumer nodes and/or producer nodes discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various BIER enabled ICN forwarding operations as described for various embodiments discussed herein in a network environment (e.g., for networks such as those illustrated in FIG. 1). In various embodiments, one or more of consumer nodes, producer nodes and ICN forwarders discussed herein can include software (or reciprocating software) that can coordinate in order to achieve operations associated with providing BIER enabled ICN forwarding in a network environment as discussed herein and may include any suitable algorithms, hardware, software, components, modules, logic, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, ICN forwarders, consumer nodes and/or a producer nodes as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of ICN forwarders, consumer nodes and/or producer nodes discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, managers, logic and/or machines described herein can be construed as being encompassed within the broad term 'processor'. In various embodiments, ICN forwarders, consumer nodes and/or a producer nodes discussed herein can also include suitable interfaces for receiving, transmitting, and/or otherwise communicating data or information in a network environment.

Note that in certain example implementations, operations as outlined herein to facilitate BIER enabled ICN forwarding operations in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 3 and 9-10] can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, or the like that are executed to carry out operations described herein.

A processor (e.g., a hardware processor) can execute any type of instructions associated with data to achieve the operations detailed herein. In one example, a processor [as shown in FIGS. 3 and 9-10] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, forwarders, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (1) does not intend any of the appended claims to invoke paragraph (f) of 35 U.S.C. Section 112 as it exists on the date of the filing hereof unless the words "means for" or "step for" are specifically used in the particular claims; and (2) does not intend, by any statement in the specification, to limit this disclosure in any way that is not otherwise reflected in the appended claims.

What is claimed is:

1. A method comprising:
    receiving an interest packet in an Information-Centric Networking (ICN) network;
    generating a data packet that includes content that is associated with the interest packet;
    identifying a bit mask in a forwarding table, wherein the bit mask is associated with a forwarder to which the data packet is to be forwarded;
    determining that the interest packet includes a value field including a value having an identifier associated with the forwarder, a type field identifying a data type of the value, and a length field identifying a length of the value;
    based on the value, encapsulating the data packet in a header identifying the forwarder; and
    based on the bit mask and the value, forwarding the data packet to the forwarder.

2. The method of claim 1, wherein the forwarder is a neighboring forwarder that is on a path to a destination of the data packet.

3. The method of claim 1, further comprising:
    before generating the data packet, determining that the content is available.

4. The method of claim 1, further comprising:
    identifying a destination of the data packet based on information in the interest packet.

5. The method of claim 1, wherein the bit mask is one of a plurality of bit masks in the forwarding table, and wherein the plurality of bit masks are associated with respective ones of a plurality of forwarders including the forwarder.

6. The method of claim 1, wherein the forwarding table is a bit index forwarding table.

7. The method of claim 1, wherein the content includes video data.

8. An apparatus comprising:
    a network interface configured for network communications; and
    one or more processors operatively coupled to the network interface, wherein the one or more processors are configured to:
        receive an interest packet in an Information-Centric Networking (ICN) network;
        generate a data packet that includes content that is associated with the interest packet;
        identify a bit mask in a forwarding table, wherein the bit mask is associated with a forwarder to which the data packet is to be forwarded;
        determine that the interest packet includes a value field including a value having an identifier associated with the forwarder, a type field identifying a data type of the value, and a length field identifying a length of the value;
        based on the value, encapsulate the data packet in a header identifying the forwarder; and
        based on the bit mask and the value, forward the data packet to the forwarder.

9. The apparatus of claim 8, wherein the forwarder is a neighboring forwarder that is on a path to a destination of the data packet.

10. The apparatus of claim 8, wherein the one or more processors are further configured to:
    before generating the data packet, determine that the content is available.

11. The apparatus of claim 8, wherein the one or more processors are further configured to:
  identify a destination of the data packet based on information in the interest packet.

12. The apparatus of claim 8, wherein the bit mask is one of a plurality of bit masks in the forwarding table, and wherein the plurality of bit masks are associated with respective ones of a plurality of forwarders including the forwarder.

13. The apparatus of claim 8, wherein the forwarding table is a bit index forwarding table.

14. The apparatus of claim 8, wherein the content includes video data.

15. One or more non-transitory computer readable storage media encoded with instructions that, when executed by a processor, cause the processor to:
  receive an interest packet in an Information-Centric Networking (ICN) network;
  generate a data packet that includes content that is associated with the interest packet;
  identify a bit mask in a forwarding table, wherein the bit mask is associated with a forwarder to which the data packet is to be forwarded;
  determine that the interest packet includes a value field including a value having an identifier associated with the forwarder, a type field identifying a data type of the value, and a length field identifying a length of the value;
  based on the value, encapsulate the data packet in a header identifying the forwarder; and
  based on the bit mask and the value, forward the data packet to the forwarder.

16. The one or more non-transitory computer readable storage media of claim 15, wherein the forwarder is a neighboring forwarder that is on a path to a destination of the data packet.

17. The one or more non-transitory computer readable storage media of claim 15, wherein the instructions further cause the processor to:
  before generating the data packet, determine that the content is available.

18. The one or more non-transitory computer readable storage media of claim 15, wherein the instructions further cause the processor to:
  identify a destination of the data packet based on information in the interest packet.

19. The one or more non-transitory computer readable storage media of claim 15, wherein the bit mask is one of a plurality of bit masks in the forwarding table, and wherein the plurality of bit masks are associated with respective ones of a plurality of forwarders including the forwarder.

20. The one or more non-transitory computer readable storage media of claim 15, wherein the forwarding table is a bit index forwarding table.

\* \* \* \* \*